United States Patent
Song et al.

(10) Patent No.: US 11,443,237 B1
(45) Date of Patent: Sep. 13, 2022

(54) CENTRALIZED PLATFORM FOR ENHANCED AUTOMATED MACHINE LEARNING USING DISPARATE DATASETS

(71) Applicant: Amazon Technologies, Inc., Seattle, WA (US)

(72) Inventors: Hyunjoon Song, East Palo Alto, CA (US); Bindu Priya Reddy, San Francisco, CA (US); Shuyi Zhang, Santa Clara, CA (US); Venkatesh Maralavadi Sreenivas, Santa Clara, CA (US); Madan Mohan Rao Jampani, Mountain View, CA (US); Stefano Stefani, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 373 days.

(21) Appl. No.: 16/696,165

(22) Filed: Nov. 26, 2019

Related U.S. Application Data

(60) Provisional application No. 62/771,517, filed on Nov. 26, 2018.

(51) Int. Cl.
| | |
|---|---|
| *G06F 15/16* | (2006.01) |
| *G06N 20/00* | (2019.01) |
| *G06F 16/338* | (2019.01) |
| *G06F 21/62* | (2013.01) |
| *G06F 16/245* | (2019.01) |
| *G06F 9/54* | (2006.01) |
| *G06F 9/451* | (2018.01) |

(52) U.S. Cl.
CPC ............ *G06N 20/00* (2019.01); *G06F 9/451* (2018.02); *G06F 9/543* (2013.01); *G06F 16/245* (2019.01); *G06F 16/338* (2019.01); *G06F 21/6218* (2013.01)

(58) Field of Classification Search
CPC ........ G06F 9/451; G06F 9/543; G06F 16/245; G06F 16/338; G06F 21/6218; G06N 20/00
USPC ........................................................ 709/200
See application file for complete search history.

(56) References Cited

U.S. PATENT DOCUMENTS

| | | | | |
|---|---|---|---|---|
| 10,680,875 | B2 * | 6/2020 | Tapia | H04L 41/5074 |
| 10,748,118 | B2 * | 8/2020 | Fang | G06N 20/00 |
| 10,783,161 | B2 * | 9/2020 | Bhide | G06F 16/84 |
| 10,831,471 | B2 * | 11/2020 | Swierc | G06N 5/025 |
| 10,891,694 | B1 * | 1/2021 | Leise | G07C 5/0866 |
| 10,977,553 | B2 * | 4/2021 | Rippel | G06V 30/18057 |
| 11,068,530 | B1 * | 7/2021 | Oringer | H04L 67/20 |

(Continued)

*Primary Examiner* — Moustafa M Meky
(74) *Attorney, Agent, or Firm* — Knobbe Martens Olson & Bear LLP

(57) ABSTRACT

Systems and techniques are disclosed for a centralized platform for enhanced automated machine learning using disparate datasets. An example method includes receiving user specification of one or more data sources to be integrated with the system, the data sources storing datasets to be utilized to train one or more machine learning models by the system, and the datasets reflecting user interaction data. A dataset is imported from the data source, and machine learning models are automatically trained based a particular machine learning model recipe of a plurality of machine learning model recipes. A first trained machine learning model is implemented, with the system being configured to respond to queries based on the implemented machine learning model, and with the responses including personalized recommendations.

21 Claims, 12 Drawing Sheets

(56) References Cited

U.S. PATENT DOCUMENTS

| | | | |
|---|---|---|---|
| 11,141,115 B2* | 10/2021 | Benson | G16H 20/40 |
| 11,263,551 B2* | 3/2022 | Krishnan | G06N 20/00 |
| 2019/0266490 A1* | 8/2019 | Rippel | G06N 3/04 |
| 2020/0151615 A1* | 5/2020 | Krishnan | G06N 7/005 |
| 2020/0320592 A1* | 10/2020 | Soule | G06T 11/00 |
| 2021/0342946 A1* | 11/2021 | Leise | H04L 9/3239 |

* cited by examiner

CENTRALIZED PLATFORM FOR ENHANCED AUTOMATED MACHINE LEARNING USING DISPARATE DATASETS

CROSS-REFERENCE TO RELATED APPLICATION

This application claims benefit of U.S. Provisional Patent Application No. 62/771,517, entitled CENTRALIZED PLATFORM FOR ENHANCED AUTOMATED MACHINE LEARNING USING DISPARATE DATASETS and filed on Nov. 26, 2018, the entirety of which is incorporated herein by reference.

BACKGROUND OF THE INVENTION

Entities, such as businesses, may generate substantial quantities of data during their normal operations. With respect to an entity which provides cloud-based storage, the entity may generate data regarding usage statistics of the storage. For example, the entity may generate logs describing an amount of storage utilized by each subscribing user in periodic time intervals. These logs may thus reflect, at least, an identification of a subscribing user, a time stamp, and an amount of storage. It should be appreciated that these generated logs may be utilized by the entity to forecast usage of storage. As an example, the entity may utilize electronic spreadsheet applications to determine forecasts. The electronic spreadsheet application may provide limited statistical functions, which the entity may supplement with prior expertise, instinct, and so on.

While the above scheme may provide a modicum of benefit with respect to the limited data described above, it is unable to cope with the plethora of modern-day datasets. For example, there may be 10, 20, 100, disparate datasets which are automatically generated during normal operations. The electronic spreadsheet application is unlikely to be able to ingest such quantities of data, let alone determine how the datasets are inter-related. Thus, determining analyses based on these datasets presents substantial technological challenges.

Similarly, the above scheme may be unable to cope with the routine updating of such datasets. For example, these datasets may be updated every minute, every hour, every day, and so on. Using an electronic spreadsheet application, an entity may be unable to quickly supplement the analyzed data with fresh data. Thus, the entity's forecasts may be constrained based on its inability to rapidly ingest and analyze fresh data.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

DETAILED DESCRIPTION

Figure 1:
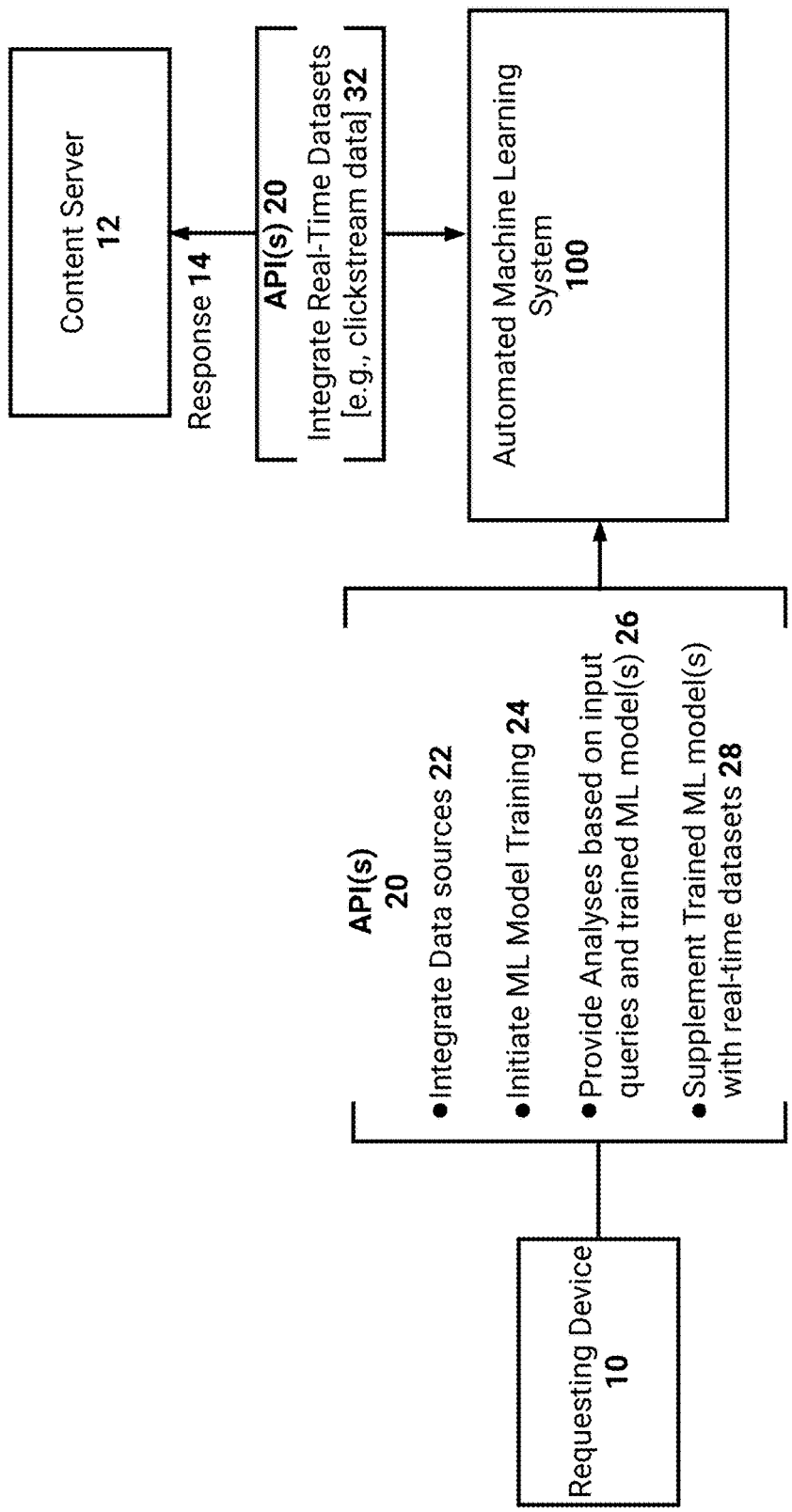
FIG. 1 illustrates a block diagram of example application programming interfaces (APIs) associated with an example automated machine learning system described herein.

Although particular embodiments are described herein, other embodiments, including embodiments that do not provide all of the benefits and features set forth herein, will be apparent to those of ordinary skill in the art.

INTRODUCTION

This specification describes techniques to employ innovative machine learning techniques automatically on arbitrary datasets associated with an entity. As will be described, a system may obtain disparate datasets optionally from different data sources. The system may, for example, be a cloud-based system such as the automated machine learning system 100 described below. The system may analyze these obtained datasets, and automatically train one or more machine learning models. For example, the trained machine learning models may be determined, by the system, to be optimal for the datasets (e.g., optimal based on one or more error metrics). Additionally, the system may optimize hyperparameters of the machine learning models to further tailor the models to the datasets. Example machine learning models include neural networks (e.g., DeepAR, MQ-RNN, sequence models, and so on), clustering-based learning schemes, and so on. Optionally, the system may utilize other techniques, such as exponential smoothing, ARIMAX, and so on. The system may then host these models and respond to queries from the entity. In this way, the machine learning models may be a service to which the entity may query.

As will be described, the system may respond in real-time (e.g., substantially real-time) to received queries. An entity may provide queries relating to visualizing forecasts, performing 'what/if' ad-hoc scenario analyses, and so on. An entity may additionally provide queries requesting personalized recommendations for users of an electronic marketplace or streaming platform offered by the entity. For example, the system may determine one or more recommended items, services, and so on, for a user based on a trained machine learning model. With respect to personalized recommendations, the entity may operate a content streaming service. In this example, the entity may therefore provide recommended content to users (e.g., recommended videos to stream, recommended music to stream). Advantageously, the entity may leverage the system to present, in substantially real-time, recommendations to users as they utilize the content streaming service. Thus, the system may provide a platform for machine-learning as a real-time service.

Advantageously, the system may mask complex back-end processing associated with machine learning models from the entity. Instead, the entity may view, for example via a user device, succinct user interfaces which rapidly enable deep functionality to be performed by the system. Additionally, the entity may leverage application programming interface (API) calls associated with the system. For example, via an API call the entity may cause the system to import gigabytes, terabytes, and so on, of different datasets prepared according to different formats and/or schemas. As will be described, the system may ingest these datasets and prepare the datasets to be analyzed via machine learning models. Similarly, the system may train one or more machine learning models without the immense technical knowledge and requirements previously associated with such training.

In this way, the entity may merely indicate datasets which the entity may normally generate during normal operations and gain easy to digest insights. Without the techniques described herein, an entity may be required to ensure that all of its datasets, which may be terabytes or more of information, are in a certain same format or have been modified in a certain way. The entity may also be required to have substantial computing power with very quick bandwidth between the computing power and systems storing the datasets. Furthermore, being able to properly utilize such machine learning techniques presents great technological challenges. For example, absent the techniques described herein, the entity may be required to have an engineering team devoted to implementing machine learning. Even with such an engineering team, there is great technical complexity in ensuring that the entity's datasets may be properly utilized by the implemented machine learning. The above-described disruption to the entity's normal operations may cause the entity to forego such machine learning schemes, and thus rely on less effective techniques. For example, techniques based on electronic spreadsheet applications.

Thus, the techniques described herein address technological problems and improve the functioning of prior-based schemes to analyze disparate datasets. For example, an entity may leverage the power of complex machine learning techniques without being required to deal with the intricacies of these techniques. Thus, the system may democratize utilization of machine learning techniques via the simplified schemes described herein. An entity may thus provide their datasets, without great concern regarding relevance, and the system may automatically ascertain relevance, and inter-relations, between any of the entity's datasets.

As an example, an entity may provide cloud-based processing functionality. This entity may have immense quantities of datasets automatically generated (e.g., log data). With the techniques described herein, the entity may rapidly enable insights into forecasting related to the cloud-based processing. For example, the entity may ascertain an impact of an upcoming product launch, forecasts regarding anticipated traffic surges, reasons for which a forecasted traffic surge may be caused, and so on. In contrast, prior forecasting techniques may treat individual datasets (e.g., time-series) separately.

The description above has included reference to an entity performing actions. It should be understood that reference to an entity performing actions may indicate that a user, or person, associated with the entity is performing an action. For example, the user, or person, may perform an action via a user device associated with the entity.

Overview

As described above, the system may import datasets from data sources. These datasets may then be utilized to train machine learning models. A data source may be obtained from cloud-based storage. For example, the cloud-based storage may be associated with, or enabled by, the system. In this example, an entity may utilize a user interface, or application programming interface (API) call, to rapidly integrate the data source. As another example, the cloud-based storage may be associated with a third party cloud-storage system. In this example, the entity may utilize APIs to cause the third party cloud-storage to integrate with the system. A data source may also be obtained from a database. As will be described, the system may query these databases to import datasets, for example via Java Database Connectivity (JDBC) or Open Database Connectivity (ODBC) interface. Additionally, a data source may be a file, such as remote comma separated value (CSV) file or a CSV file uploaded by the entity. Integrating data sources is more described in more detail below, with respect to at least FIGS. 2A-3B.

As will be described, these datasets may reflect user interaction data. For example, an entity may operate an online content streaming platform. An example of an online content streaming platform may include a video streaming service, a music streaming service, and so on. The user interaction data may indicate (e.g., in respective rows), an identification of a user, an identification of content to which the user interacted, and a time stamp associated with the interaction. As another example, an entity may operate an electronic marketplace. In this example, the electronic marketplace may enable access (e.g., via one or more web pages) to landing pages associated with items. The user interaction data may thus indicate (e.g., in respective rows), an identification of a user, an identification of an item to which the user interacted, and a time stamp associated with the interaction.

In addition to the above-described user interaction data, the datasets may include contextual datasets. With respect to the examples described above, the contextual data may include features associated with the users. For example, the features may indicate demographic information, location information, and so on associated with the users. The contextual data may also include features associated with the content or items. For example, the features may indicate a type of the content (e.g., horror movie, classical song), actors in the movies, directors of the movies, artists in music, and so on. As will be described, the system may utilize these contextual datasets to supplement the user interaction data.

The datasets may additionally, or alternatively, reflect time-series datasets. It should be appreciated that a time-series dataset may be automatically generated via an entity (e.g., a system associated with the entity) through sampling of disparate information periodically, or upon occurrence of an event. For example, a time-series dataset may reflect usage of a virtualized processor as measured periodically (e.g., every 10 seconds, every minute, and so on). Thus, the example time-series dataset may indicate (e.g., in respective rows), an identification of a virtualized processor, a time stamp, and a value (e.g., usage). As another example, a time-series dataset may reflect sensors recording certain events. Examples of events may include times at which a person is detected by the sensor. Thus, the example time-series dataset may indicate (e.g., in respective rows), an identification of a sensor, a time stamp, and a value (e.g., the detection).

Similar to the above, the time-series datasets may be associated with contextual data. The contextual data may be, for example, metadata describing a time-series dataset. As an example, a time-series dataset may include energy consumption for different properties. In this example, the contextual metadata may indicate a location of each property. Contextual data may additionally characterize certain information included in a time-series dataset. For example, a time-series dataset may include item sales. In this example, the contextual data may indicate that on a certain day, the air was of poor quality (e.g., due to smoke). Thus, item sales on the certain day may not reflect normal sales. Contextual data may further include other information, such as dates of holidays, the weather information for each day or time period, commodity indices, and so on. As will be described, the system may train machine learning models based on the time-series datasets and associated contextual data.

The system may then utilize the imported datasets to train one or more machine learning models. The system may automatically train the machine learning models based on the imported datasets. For example, the system may determine a machine learning model which provides superior performance to that of other machine learning models. As will be described, performance may be measured according to error metrics determined for each trained machine learning model. Subsequent to training, the system may implement (e.g., host) the trained machine learning. One or more APIs may then be leveraged by the entity to provide queries to the system.

Optionally, the system may select certain machine learning model recipes based on heuristics or other data associated with the imported datasets. For example, if the datasets relate to supply chain information the system may select one or more machine learning model recipes. In contrast, if the datasets relate to network capacity the system may select one or more other machine learning model recipes. In this way, the system may advantageously reduce an extent to which different machine learning models need to be trained, as the system may identify candidate machine learning models based on heuristics. Still further, in some embodiments, the system may utilize templates or domains a template. With respect to time-series datasets, example templates may identify intended types of data processing or forecasting, such as supply chain forecasting, network capacity forecasting, staffing forecasting, and so on. Templates illustratively may inform the machine learning model recipes which are utilized by the system to train machine learning models. For example, the system may utilize the template to indicate that a first type of machine learning model (e.g., a neural network) will likely produce less error than a second type of machine learning model (e.g., a clustering model). Thus, the system may avoid training this second type of machine learning model to conserve processing resources and reduce a time of processing for the user.

A recipe, as described herein, refers to a particular type of machine learning model. As an example, a recipe may refer to a recurrent neural network. In this example, the system may thus train a recurrent neural network based on the imported datasets. A recipe, however, may additionally be fine-grained. For example, the recipe described above may refer to a recurrent neural network with gated recurrent units or long short-term memory cells. As another example, a recipe may further indicate that certain hyperparameters are to be utilized or that respective ranges of hyperparameters are to be utilized. With respect to a recurrent neural network, the system may thus train multitudes of recurrent neural networks with hyperparameters selected from the ranges. Examples of hyperparameters may include a number of layers, a number of hidden layers, a number of neurons, activation functions, and so on. Thus, the system may perform a search within the space of hyperparameters to train a recurrent neural network with superior performance to that of other recurrent neural networks within the space of hyperparameters.

Optionally, the system may deter nine that multiple machine learning models are to be implemented (e.g., hosted). For example, the system may determine that a certain machine learning model is to be utilized for a subset of features. In this example, and with respect to an entity operating an electronic marketplace, the system may determine that a first machine learning model is to be utilized for a first category of items. Thus, for a second category of items the system may use a second, different, machine learning model. Optionally, the system may combine outputs associated with different machine learning models when responding to a query. The machine learning model may also be provided by the entity, such as part of the data set importation process or as an independent process.

As will be described in more detail below, the system may then respond to queries, or other requests, received from an entity. For example, a query may request that a certain forecast be determined. An example forecast may indicate a future, anticipated, demand for a certain product or service. As another example, a query may request that the system provide personalized recommendations based on a user ID. As another example, a query may request that the system provide user IDs of users' who are to be recommended a provided item or content ID.

Advantageously, an entity may access a centralized user interface (e.g., a user console) from which the entity may look up forecast information, visualize forecasts, cause 'what-if' scenario analyses to be performed, and so on. Thus, the user interface may represent a centralized repository of machine learning-based information and functionality. An example of the user interface is described in more detail below, with respect to FIG. 6A.

Overview of Example APIs

FIG. 1 illustrates a block diagram of example application programming interfaces (APIs) 20 associated with an example automated machine learning system 100 described herein. The automated machine learning system 100 may be a system of one or more computers, one or more virtual machines executing on a system of one or more computers, and so on. As described above, the automated machine learning system 100 may import datasets associated with an entity. The system 100 may then train one or more machine learning models usable to characterize the datasets. Additionally, the machine learning models may be utilized to generate forecasts, personalized recommendations, and so on.

Examples of the APIs 20 illustrated in FIG. 1 are described below. It should be appreciated that each of the APIs may be separated into multiple API calls or may be combined into a same API call. Additionally, while the APIs 20 may be leveraged to provide easy-access to the automated machine learning system 100, succinct user interfaces may be accessed which provide the same, or similar, functionality. For example, FIG. 2 illustrates an example of a user interface for integrating data sources.

These user interfaces may optionally be associated with the automated machine learning system 100. For example, the system 100, or a presentation system in communication with the system, may execute a web application associated with the user interfaces. The user interfaces may optionally also be designed by third-parties. These user interfaces may leverage the APIs 20 to communicate with the automated machine learning system 100. Thus, an entity may utilize its own-designed user interface or utilize a user interface designed by a different entity.

As illustrated in FIG. 1, a requesting device 10 is utilizing one or more APIs 20 associated with the automated machine learning system 100. The requesting device 10 may represent a user device of a user of an entity. Examples of user devices may include laptops, mobile devices, wearable devices, tablets, and so on. Optionally, the requesting device 10 may be a device associated with an intelligent personal assistant. In this example, a user of the requesting device 10 may provide verbal commands associated with one or more of the APIs 20.

The APIs 20 may be leveraged to implement the functionality described herein. Thus, the functionality afforded by the automated machine learning system 100 may be integrated in different systems and devices. For example, a developer may integrate the APIs 20 in software code utilized by the systems and devices. As an example, the requesting device 20 may execute software code, such as in an application, which is configured to communicate with the automated machine learning system 100 via the APIs 20. In this example, the software code or application may enable a user of the requesting device 20 to query the automated machine learning system 100. As another example, a content server 12 may utilize the APIs to communicate with the automated machine learning system 100. In this example, the content server 12 may present personalized item recommendations to users of an electronic marketplace hosted by the content server 12. To improve upon the item recommendations, the content server 12 may utilize the APIs to obtain recommendations tailored to each user from the automated machine learning system 100. The content server 12 may then present these recommendations.

As an example of an API 22, data sources may be integrated with the automated machine learning system 100. The API 22 may enable actions of import, export, and delete of datasets associated with the data sources. For example, an entity may utilize the API 22 to specify schemes with which the automated machine learning system 100 may obtain datasets from one or more data sources. As will be described in more detail below, with respect to at least FIG. 2A, the data sources may comprise cloud-based storage. In this example, the API 22 may specify information sufficient for the automated machine learning system 100 to access the cloud-based storage. As an example, a first cloud-based storage provider may provide APIs to enable automated access. Thus, the API 22 may securely provide authentication information usable by the automated machine learning system 100 to access the first cloud-based storage provider.

Additionally, the API 22 may enable the easy importation of flat files, such as comma separated value (CSV) files. The API 22 may be utilized to specify a location (e.g., a network location) at which a CSV can be found. When executed, the API 22 may thus obtain the CSV file and cause it to be imported by the automated machine learning system 100. As another example, the API 22 may enable interaction with one or more databases. For example, queries may be packaged according to different database interfaces. Examples of database interfaces may include Java Database Connectivity (JDBC) or Open Database Connectivity (ODBC) interfaces.

In addition to causing importation of datasets, API 22 may enable mapping of specific information included in the datasets to features. For example, the datasets may comprise database tables. In this example, specific columns may correspond to particular features. Thus, the automated machine learning system 100 may import these database tables with the associated labeled features.

As another example, API 24 may be utilized to initiate machine learning model training. For example, the API 24 may trigger the automated machine learning system 100 to train one or more models. As will be described below, an entity may select a particular recipe with which to train a machine learning model. An entity may also indicate that the automated machine learning system 100 is to determine a machine learning model based on training multitudes of such machine learning models. Thus, the API 24 may be utilized to specify preferences regarding the machine learning model.

To access the trained machine learning model, API 26 may be utilized. This example API 26 may enable an entity to provide queries to the automated machine learning system 100 for processing. Results associated with the queries may optionally be provided to the entity as a visual response (e.g., presented via a user interface). Results may also be provided as a CSV file, for example as a time-series forecast. Optionally, the results may be provided in a particular file format (e.g., JavaScript Object Notation). Using the API 26, the results may be automatically ingested via an enterprise system, a cloud-storage system, a database, and so on. In this way, the entity may easily obtain the results.

As an example, an entity may prefer that the automated machine learning system 100 generate a forecast. The example API 26 may be called (e.g., via REST) as:

forecast (itemId, time interval, [optional parameters])

The above API 26 call may return the forecasts for that particular item ID over a time interval defined by a start date, end date, and a granularity. An example optional parameter may include terms such as, which quantiles of the forecast should be returned. Another example optional parameter may over-ride values of causals (e.g., future price or promotions), which may be used by the automated machine learning system 100 to estimate how they influence the forecast.

As another example of an API, API 28 may be utilized to cause importation of real-time datasets. An example real-time dataset may include clickstream data. It should be appreciated that as users utilize different services, web pages, and so on, which are operated by entities, the users may interact with content presented by the services or web pages. For example, as a user utilizes a music streaming application or service, the user may select songs, skip portions of a same song, skip certain songs altogether, and so on. As another example, as a user utilizes an electronic marketplace, the user may view items, place items in the user's cart, checkout items, remove items from a cart, and so on. The above-described information may be included within clickstream data.

For example, the content server 12 may monitor real-time interactions of users. Thus, the content server 12 may provide this clickstream data in real-time (e.g., substantially real-time) to the automated machine learning system 100. As will be described, the automated machine learning system 100 may import this clickstream data to supplement the trained machine learning models. For example, the clickstream data may provide insights into a user's current interactions with content, item search history, and so on. This may be utilized by the automated machine learning system 100 to more accurately provide personalized recommendations for the user.

API 28 may specify information sufficient for the automated machine learning system 100 to obtain such real-time datasets from content server 12. For example, authentication information (e.g., user name/password, authentication token, and so on) may be provided via the API 28. As another example, a network address, data source information (e.g., a type of database utilized by the content server 12), and so on, may be specified. As illustrated in FIG. 1, the content server 12 is providing real-time datasets to the automated machine learning system 100. The content server 12 may optionally utilize an API 32 associated with the automated machine learning system 100. The API 32 may indicate information associated with an entity operating the content server 12. In this way, the automated machine learning system 100 may cause the real-time datasets to be imported for utilization with one or more trained machine learning models accessible to the entity. The real-time datasets may be obtained periodically by the automated machine learning system 100, for example every minute, every hour, and so on. Optionally, the content server 12 may push the real-time datasets to the automated machine learning system 100.

Example User Interface/Flowchart for Dataset Importation

The user interfaces described herein may be rendered by a browser executing on a user device (e.g., requesting device 10). For example, the user interfaces may be associated with a web application executing on a system (e.g., the automated machine learning system 100, or a presentation system in communication with the system 100). The system may be in communication with the user device via a network (e.g., the internet). In this example, the system may generate, at least in part, the user interfaces. The user device may then render the user interfaces. Additionally, the user device may receive user input from a user and route the user input to the system to update the user interfaces.

The user interfaces may also be associated with an application (e.g., an 'app') executing on a user device. In this example, the application may render, at least in part, the elements presented in the user interfaces. The system may provide information to the user device for inclusion in the user interfaces. For example, the system may provide the elements presented in user interface 50. The user device may thus receive this provided information and include it in the user interfaces.

Figure 2A:
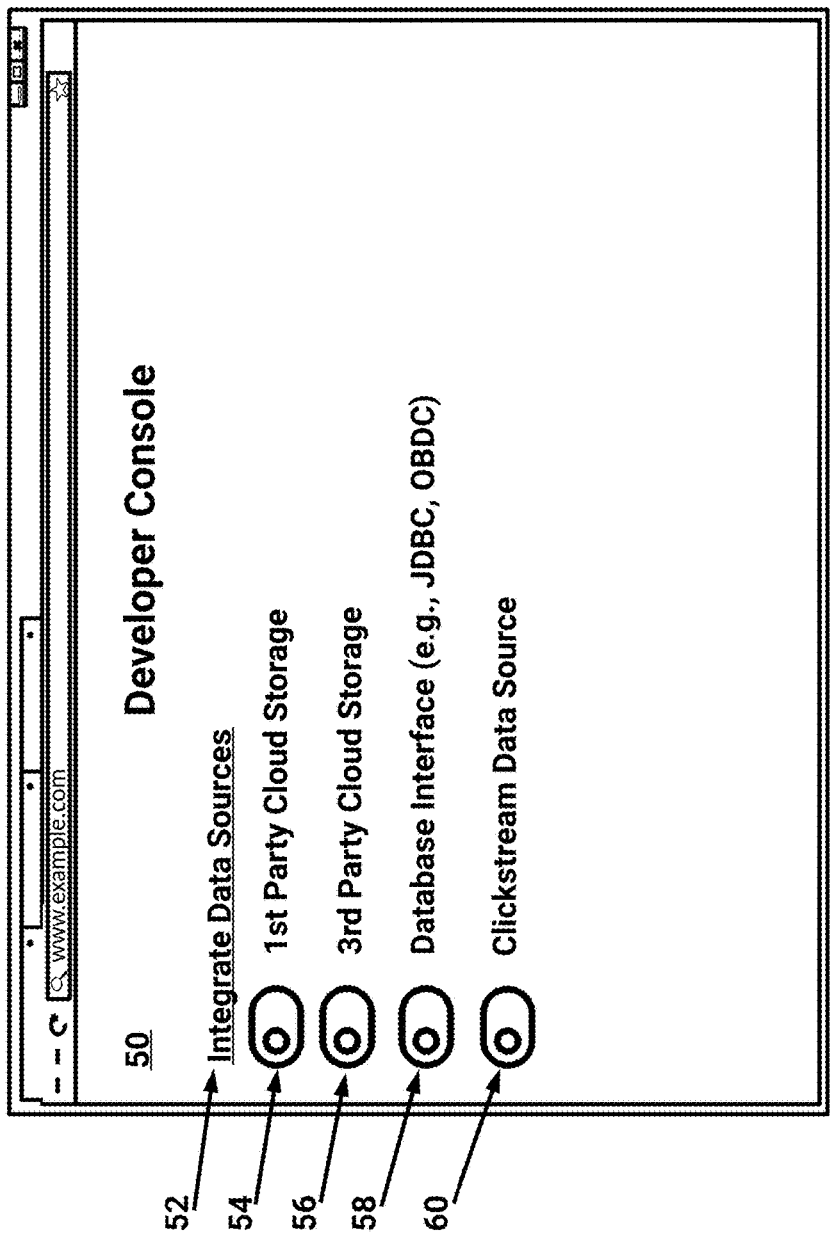
FIG. 2A illustrates an example user interface for integrating data sources according to the techniques described herein.

FIG. 2A illustrates an example user interface 50 for integrating data sources according to the techniques described herein. The user interface 50 may be presented to a user during an initial configuration process. This initial configuration process may enable the user to specify data sources to be integrated with a system (e.g., the automated machine learning system 100). The configuration process may further enable the user to cause the system to extract features from datasets associated with the data sources, select ranges of data from the datasets, and train one or more machine learning models. The user may then cause the trained machine learning models to be deployed by the system for access by the user. In this way, the user may be succinctly walked through the main aspects of creating machine learning models. The underlying, back-end, processing may thus be hidden from the user, and instead the configuration process may enable a '1-click' deployment process.

Thus, user interface 50 may reflect an initial part of the configuration process described above. Optionally, user interface 50 may be presented as part of a configuration wizard to enable the user to quickly cause machine learning models to be deployed. Once the user causes data sources to be integrated, the system may optionally automatically obtain data sets and train one or more machine learning models. In some embodiments, the user may be presented with a subsequent user interface associated with training machine learning models. For example, and as will be described in FIG. 4, a user interface may enable the user to specify details or preferences associated with the training, including the selection of custom machine learning models.

Subsequent to such training and deployment of a machine learning model, a user interface (e.g., a business console) may be utilized to leverage the machine learning model. For example, and as will be described in more detail with respect to FIG. 6A, a user may cause forecasts to be determined. The user may also cause forecasts to be visualized. The user may also pose queries and cause 'what-if' scenarios to be determined.

User interface 50 includes selectable options associated with differing types of data sources 52. A first type 54 of data source may utilize cloud-storage which the system may directly access. For example, the first type 54 of data source may be characterized as a first-party data source. The user may provide user input directed to the first type 52 of data source, and in response the user interface 50 may update to present selectable options associated with cloud-storage of the user. The user may be a user associated with an entity, for example a team, corporation, and so on, which uses cloud-storage. Thus, the user may be associated with user profile information. The user interface 50 may therefore cause the system to access the user profile information and obtain indications of the cloud-storage data sources being utilized by the entity. The user may then provide user input to select one or more of the data sources for integration or criteria, such as data ranges, for selection portions of identified data sets. In this way, the system may obtain the datasets associated with the selected data sources. Optionally, the system may present the datasets being stored in cloud-storage. In this example, the user may select from among the datasets.

An additional type of data source, referred to as a third-party data source 56, may represent a data source stored in cloud-storage not associated with the system. In this example, the cloud-storage may be accessible via one or more APIs associated with the third-party data source 56. A third-party data source 56 may also include software as a service (SaaS) storage schemes. The system may utilize integration pipelines and storage schemes associated with the SaaS storage schemes.

The user may interact with the user interface 50 to indicate selection of a third-party data source 56. In response, the user interface 50 may update to confirm authorization for the third-party data source 56 to provide datasets to the system. As an example, the user may be required to provide authentication information (e.g., a user name, password, an authorization token, and so on). Upon authorization, the user interface 50 may update to present datasets being stored by the third-party data source. The user may then select from among these datasets, and the system may request that the datasets be provided to the system for storage.

User interface 50 further enables integration of a database data source 58. In this example, the system may obtain datasets from databases using different interface schemes. As described above, an example interface scheme may include JDBC, ODBC, and so on. In addition, the system may obtain data from databases via different integration tools. An example of an integration tool includes Extract, Transform and Load (ETL) tools. Such tools may target bulk movement of data between data systems. It should be appreciated that such tools may have highly optimized deep integration for the targets and sources. Thus, they may be optimized for bulk transformations in the datasets. Another example of an integration tool includes Enterprise Service Bus (ESB) tools. These tools may be designed for near real time application to application data sharing. ESB tools may provide similar functionality that of ETL tools (e.g., transformations, automation, and triggers).

Advantageously, the user interface 50 may enable the easy importation of clickstream data 60. The user may provide user input to the user interface 50 to indicate selection of the clickstream data 60, and may also configure access to such data. For example, the clickstream data may be provided a content server associated with an electronic marketplace, a video or audio streaming platform, and so on. The content server may thus provide (e.g., stream) clickstream data to the system subsequent to its configuration via user interface 50.

As described above, clickstream data 60 may represent real-time (e.g., substantially real-time) data describing interactions of users. For example, with respect to the data sources representing user interaction data, the clickstream data may provide access to recent interactions of users. Since the system may receive updates to user interaction data periodically, or upon a push from a data source, the system may, in some embodiments, not have the most recent interaction data. Thus, the clickstream data may enable content servers to provide such recent interactions. As will be described, the system may utilize the clickstream data to supplement trained machine learning models. Additionally, the clickstream data may be aggregated and utilized to update the machine learning models periodically.

As will be described below, with respect to at least FIGS. 3A-3C, the integrated data sources may thus provide datasets for importation by the system. For datasets including user interaction data, a schema may be specified by a user. For example, the datasets may indicate, at least, an 'item ID', a 'user ID', and a time stamp. In this example, the 'item ID' may correspond to an item (e.g., an item available for selection via a marketplace, a streaming content item), 'user ID' may correspond to a user, and a time stamp may indicate the time at which the user interacted with the item. The datasets may further include additional information, such as additional key/value pairs. The schema may therefore indicate that a particular attribute has a particular data type. As an example, a dataset may include key/value pairs indicating a type of device (e.g., mobile device, tablet) utilized by a user to interact with an item. In this example, the schema may identify that a particular column of values corresponds to a type of device.

Figure 2B:
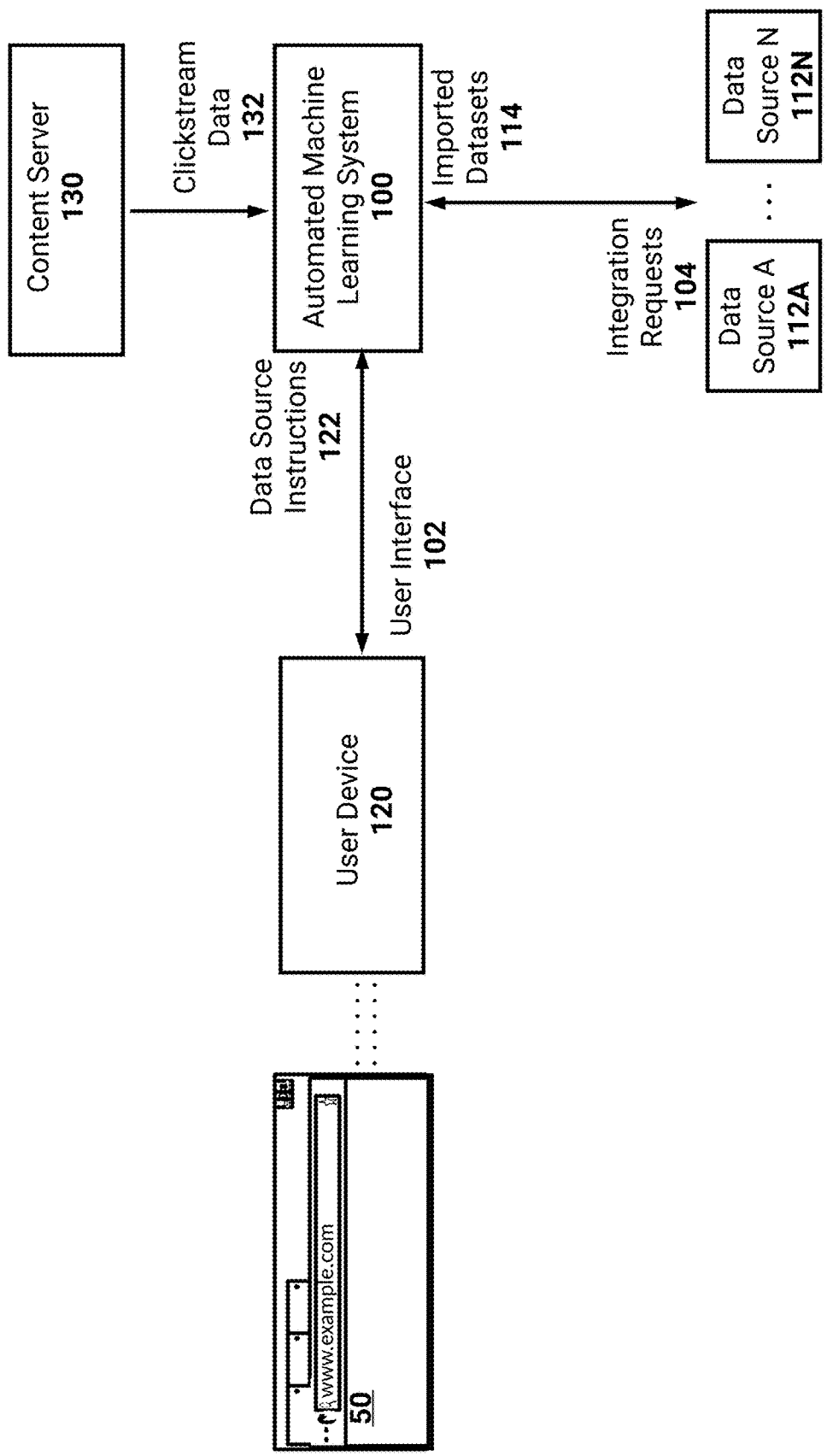
FIG. 2B illustrates a block diagram of an automated machine learning system integrating data sources.

FIG. 2B illustrates a block diagram of an automated machine learning system 100 integrating data sources 112A-N. As described above, the automated machine learning system 100 may receive data source instructions 122 from a user device 120 of a user. Optionally, the automated machine learning system 100 may provide user interface information 104 to the user device 120 for presentation. An example user interface may include user interface 50 described in FIG. 2A.

In the example of FIG. 2B, the automated machine learning system 100 has provided integration requests 104 to data sources 112A-N. Integrating these data sources 112A-N may include obtaining imported datasets 114 from the data sources 112A-N. Optionally, the automated machine learning system 100 may periodically obtain such data sources 112A-N. For example, once the data sources 112A-N are integrated with the system 100, the system 100 may be configured to periodically request updates to the datasets 114. The data sources 112A-N may additionally push updates to the datasets 114.

Additionally, an example content server 130 is illustrated as providing clickstream data 132 to the automated machine learning system 100. As described above, the clickstream data 132 may be utilized to supplement trained machine learning models being implemented by the automated machine learning system 100. For example, and as will be described, a trained machine learning model may generate personalized item recommendations based on a specified user ID. In this example, the clickstream data may be accessed and recent item interactions by a user associated with the user ID may be obtained. These recent item interactions may be utilized as a signal for the trained machine learning model.

Figure 3A:
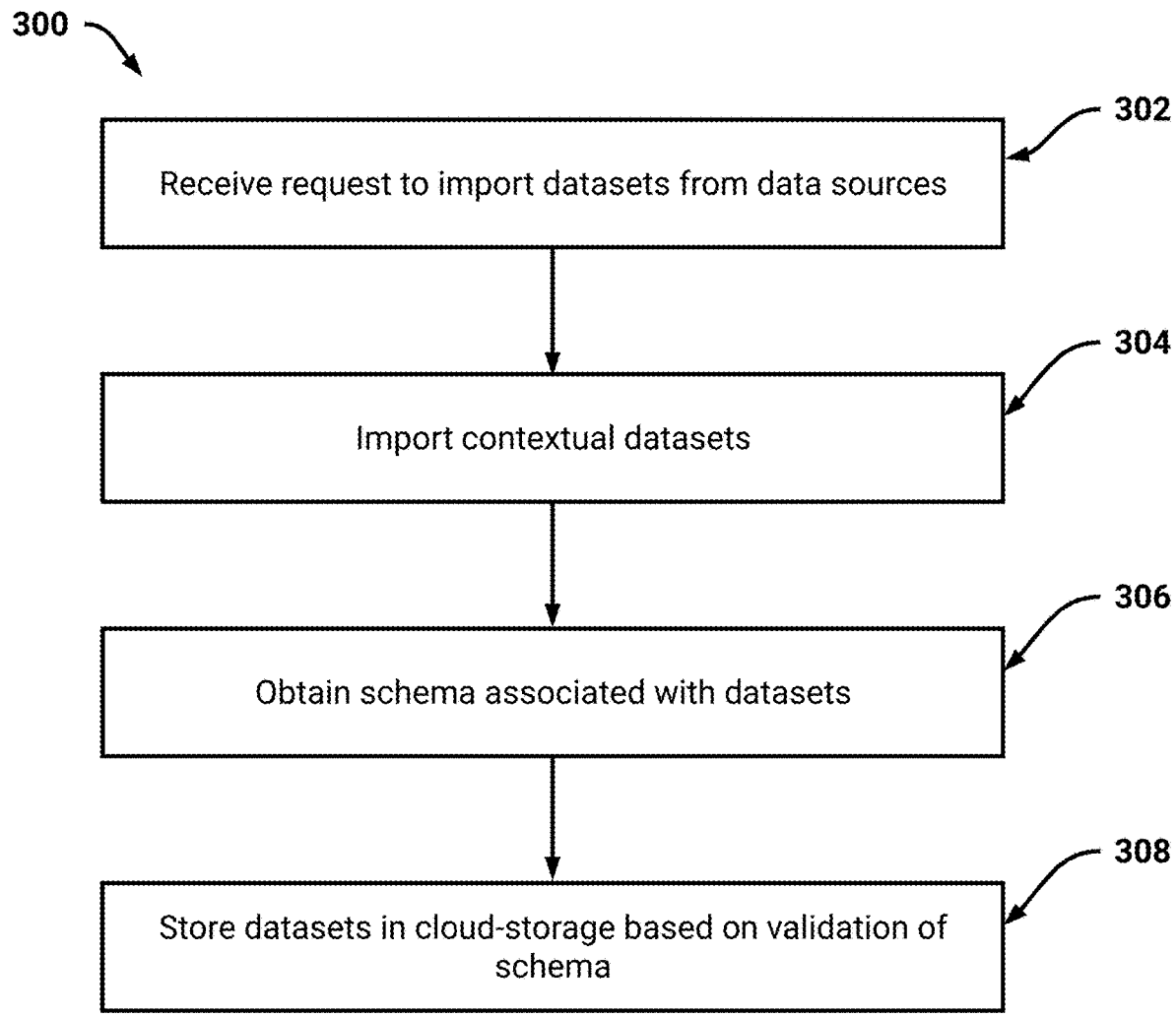
FIG. 3A illustrates a flowchart of an example process for importing datasets received from integrated data sources.

FIG. 3A illustrates a flowchart of an example process 300 for importing datasets received from integrated data sources. For convenience, the process 300 will be described as being performed by a system of one or more computers (e.g., the automated machine learning system 100).

At block 302, the system receives a request to import a dataset from a data source. As described above, with respect to FIGS. 1-2B, the system may respond to application programming interface (API) calls. Thus, the request may be provided by a user using an API call. Additionally, the user may utilize a user interface to specify the data source. The user may further specify the particular dataset to be imported, or the system may optionally obtain all datasets included in the data source. As will be described in FIG. 3B, the dataset may include user interaction data. As will be described in FIG. 3C, the dataset may include time-series data. These datasets may optionally be imported according to respective schemes.

At block 304, the system imports one or more contextual datasets. The contextual datasets may include metadata describing features of the imported dataset. With respect to the example of user interaction data, the contextual datasets may describe features associated with users. For example, the features may include the user's location, social network friends of the user, messages or reviews posted by the user, age of the user, and so on. The contextual datasets may further include features associated with items. For example, with respect to one or more items being books, the contextual datasets may indicate information about authors, titles of the books, years the books were published, and so on. As another example, and with respect to one or more items being movies, the contextual datasets may indicate a type or subject-based classification of a movie, a director of the movie, actors in the movie, year the movie was made, an amount the movie grossed in the year it was released, an amount the movie has grossed since, critic ratings of the movie, any adjustment in the ratings since release (e.g., indicating if the movie has become a cult classic), and so on.

With respect to a time-series dataset, the contextual datasets may be selected by the user from existing datasets (or selected portions thereof) stored by the system. For example, the system may store contextual datasets indicating historical holidays, prior weather patterns in different geographic areas, search engine trend information (e.g., with respect to items, companies, and so on), market share data of items or companies, regional utility usage information, commodity indices, and so on. These contextual datasets may be utilized by the system, for example, when determining forecasts. As an example, the user may be associated with an entity which offers server-hosting, web application hosting, and so on, to other entities. In this example, the user may request that a forecast related to server-processing demand be determined. It may be beneficial for the system to utilize the holiday dataset to determine that certain holidays, such as Thanksgiving, are associated with increases in server-processing demand. For example, electronic marketplaces hosted by the entity may see increased traffic.

To select these existing contextual datasets, the user may optionally utilize a user interface (e.g., user interface 50 illustrated in FIG. 2B). The user interface may, for example, present indications of contextual datasets from which the user may select. Optionally, the system may provide recommendations regarding contextual datasets to select. For example, the system may analyze the datasets requested for importation, and provide recommendations based on these analyses. Without being constrained by theory, it may be appreciated that datasets may provide indicia utilized by the system to determine the recommendations. As an example, if a dataset reflects item sales, usage information, and so on, then the system may determine that at least a first contextual dataset (e.g., holidays) may be useful. As another example, if a dataset reflects utility usage, item sales in a physical store, then the system may determine that at least a second contextual dataset (e.g., weather information) may be useful. To effectuate these determinations, the system may determine whether error metrics have been reduced (e.g., historically reduced) based on the inclusion of such contextual datasets given similar imported datasets.

While the above described selecting existing contextual datasets, the system may further enable the user to provide unique contextual datasets. A unique contextual dataset may include information which is not publicly available, or which is not presently being stored by the system. For example, the user may provide a contextual dataset with trend information related to searches performed by end-users on search web sites. In this example, the trend information may be gathered by the user, or obtained from the search web site, and then provided to the system. The system may determine that item sales tend to increase when the item is trending on a particular search web site or social network. Similarly, the system may determine correlations between certain users of a social network recommending an item and its corresponding sales.

Advantageously, the user may provide such contextual datasets if the user thinks it may be beneficial. Utilizing the machine learning based schemes described herein, for example DeepAR, the system may determine relevance, if any, of a provided contextual dataset. In this way, the system may determine inter-relations between time-series datasets which may otherwise not be captured. For example, the system may utilize a contextual dataset associated with fuel prices to determine forecasts. In this example, and without the techniques described herein, a user may not consider such a dataset useful in forecasting demand for workers in a physical retail setting. However, the system may determine that with increasing fuel prices, a threshold number less customers may travel to the physical retail setting. Therefore, less workers may be required to checkout customers purchasing items in a timely fashion (e.g., less than a threshold wait time). As another example, a contextual dataset may indicate road Closures, pedestrian blocks, and so on. The system may determine how these contextual datasets may affect the physical retail setting.

The above has described contextual datasets which may be utilized to supplement datasets imported by the user. It should be appreciated that a contextual dataset may also provide context for certain information included in an imported dataset. For example, a contextual dataset may indicate that certain information should be considered as outliers. As an example, an entity which provides server-hosting services may have experienced abnormally low usage of their servers during a time period. In this example, the entity's consumed bandwidth, processing resources, and so on, may be low during the time period. The user may provide contextual data indicating that web sites generally were offline during the time period. Thus, the system may incorporate this contextual data as a signal indicating that the time period itself was not associated with the low usage. As another example, an entity associated with a physical retail store may provide contextual data indicating that construction was taking place proximate to its store during a time period. In this example, the system may determine that the time period itself did not negatively sales.

At block 306, the system obtains a schema associated with the datasets. As described above, a schema may be utilized to identify a key/value pair included in a dataset. With respect to user interaction data, the schema may specify that a certain attribute has a certain data type. The schema may be provided as metadata associated with a dataset or may be extracted from the dataset. For example, the user may cause a flat file to be imported. In this example, the flat file may indicate labels associated with key/value pairs. Thus, the system may extract the labels from the flat file.

Optionally, the user may utilize a user interface (e.g., user interface 50 described in FIG. 2B) to indicate a schema associated with an imported dataset. For example, the user may interact with the user interface to specify a dataset for importation. The system may then obtain the dataset. As an example, the data source from which the dataset is obtained may be integrated with the system. As another example, the user may provide the dataset via an input, or selection, box presented in the user interface. The system may then present a graphical depiction of the dataset. For example, if the dataset is a database table the system may present a representation of the database table. In this example, the representation may include a first few rows of the database table. For a user interaction dataset, the columns indicating 'user ID', 'item ID', and 'time stamp' may be automatically identified by the user. Other columns, however, may be optionally identified by the user using the user interface. For example, the user may provide user input directed to a column and specify a label, or data type, associated with the column.

At block 308, the system stores the imported datasets. For example, the system may store the datasets in cloud-storage accessible to, or operated by, the system. In this way, the system may ensure that it has a copy of the datasets. As will be described, these datasets may be routinely accessed by the system to update trained machine learning models. As will be described below, the system may store the datasets based on validation of the schema. For example, the system may remove rows from a dataset which do not conform to the schema. These rows may, as an example, have corrupted data, or be missing data. Thus, the system may remove these rows prior to storage. In this way, the system may ensure that the datasets are valid and may also reduce storage space requirements.

Figure 3B:
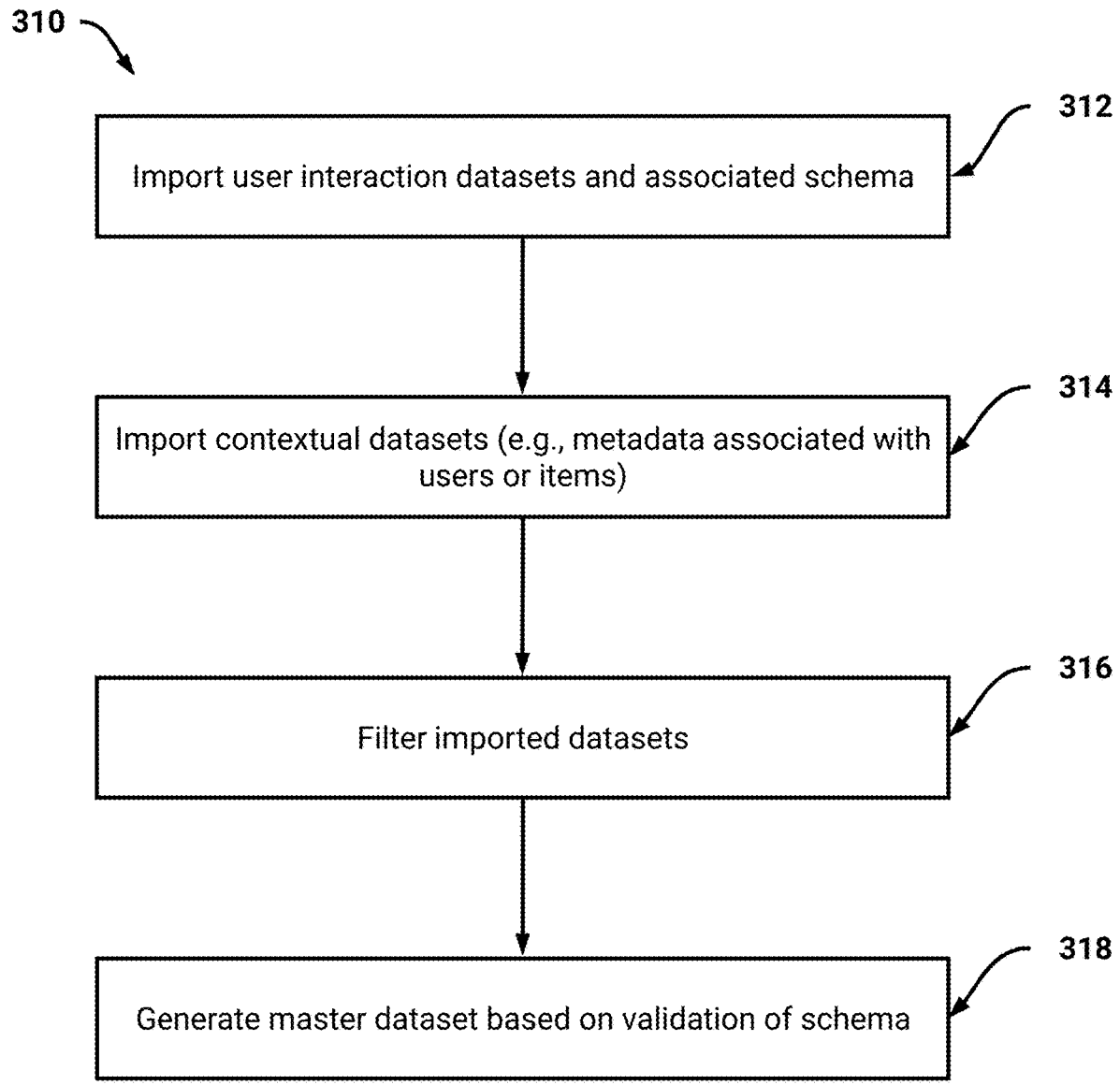
FIG. 3B illustrates a flowchart of an example process for importing user interaction datasets.

FIG. 3B illustrates a flowchart of an example process 310 for importing user interaction datasets. For convenience, the process 310 will be described as being performed by a system of one or more computers (e.g., the automated machine learning system 100).

At block 312, the system imports user interaction datasets. As described above, the user interaction datasets may describe interactions of users with respect to items presented on an electronic marketplace, content items available for streaming to user devices of the users, and so on. The datasets may thus be generated by an entity associated with the electronic marketplace or streaming services. The users may be identified according to anonymized identifiers. In this way, the system may not have access to personally identifiable information associated with the users. The user interactions datasets may additionally be provided with one or more schemas, for example as described in FIG. 3A.

At block 314, the system imports contextual datasets. The system may optionally obtain contextual datasets for utilization in training machine learning models. As described above, the machine learning models may provide better output (e.g., lower error metrics) based on the features described in the contextual datasets.

At block 316, the system filters the imported datasets. The system may perform one or more cleaning processes with respect to the imported datasets. For example, the system may automatically remove user interactions which is determined to have been caused by automated software (e.g., bots). In this example, the system may determine that a same user has rapidly interacted with different items. As an example, the user may be determined to have visited greater than a threshold number of landing pages in less than a threshold time. This may indicate that the user is a bot which is crawling web pages. An imported dataset may additionally indicate which user interactions are from bots, or which are suspected to be from bots. Thus, the entity providing the datasets may flag certain user interactions as being from bots (e.g., well behaved bots may identify themselves as such) or being suspected as being from bots. The system, or the entity, may optionally utilize machine learning techniques to identify patterns associated with bots, and then compare these patterns to the user interaction data.

In addition to filtering user interactions from bots, the system may optionally filter user interactions which involve items with greater than a threshold popularity. As will be described below, the system may train machine learning models to provide personalized recommendations. Thus, the personalized recommendations may indicate items to recommend to a particular user. The system may therefore filter items which are indicated as being popular. As an example of such an indication, the system may aggregate appearances of the items within the datasets. Optionally, the system may then filter out user interactions with a threshold number of the items which most appear. Optionally, the system may filter out user interactions with items which appear greater than a threshold number of times, greater than a threshold percentage of the total user interactions, and so on. Optionally, the system may filter out user interactions with items which are indicated as being unpopular. Similar to the above, unpopularity may be indicated as being items which appear less than a threshold number of times, are associated with less than a threshold of the total user interactions, and so on.

Thus, in some embodiments, the system may retain user interactions with items that are included in a middle of a distribution with items. The system may thus aggregate user interactions with items, and optionally normalize these user interactions. The system may then identify items which are in the middle of an interactivity curve. The user of the system may optionally specify thresholds associated with the middle. For example, the user may indicate that items with less than a threshold measure of interactivity are to be discarded. Similarly, the user may indicate that items with greater than a threshold measure of interactivity are to be discarded.

When providing personalized recommendations, and as will be described, the system may optionally introduce less popular, or new items. For example, the system may utilize bandit-based schemes, or online learning, to recommend less popular items. If the system receives information indicating that a user interacted with one of these less popular items, the system may update the trained machine learning models accordingly.

At block 318, the system generates a master dataset. The system may aggregate the information included in the imported datasets. For example, the system may perform a join to determine all user interactions associated with a same user. As described in FIG. 3A, the system may then validate the schema. The system may, for example, remove user interactions which do not confirm to the schema. As an example, the system may remove user interactions (e.g., rows) with missing values for one or more columns.

Figure 3C:
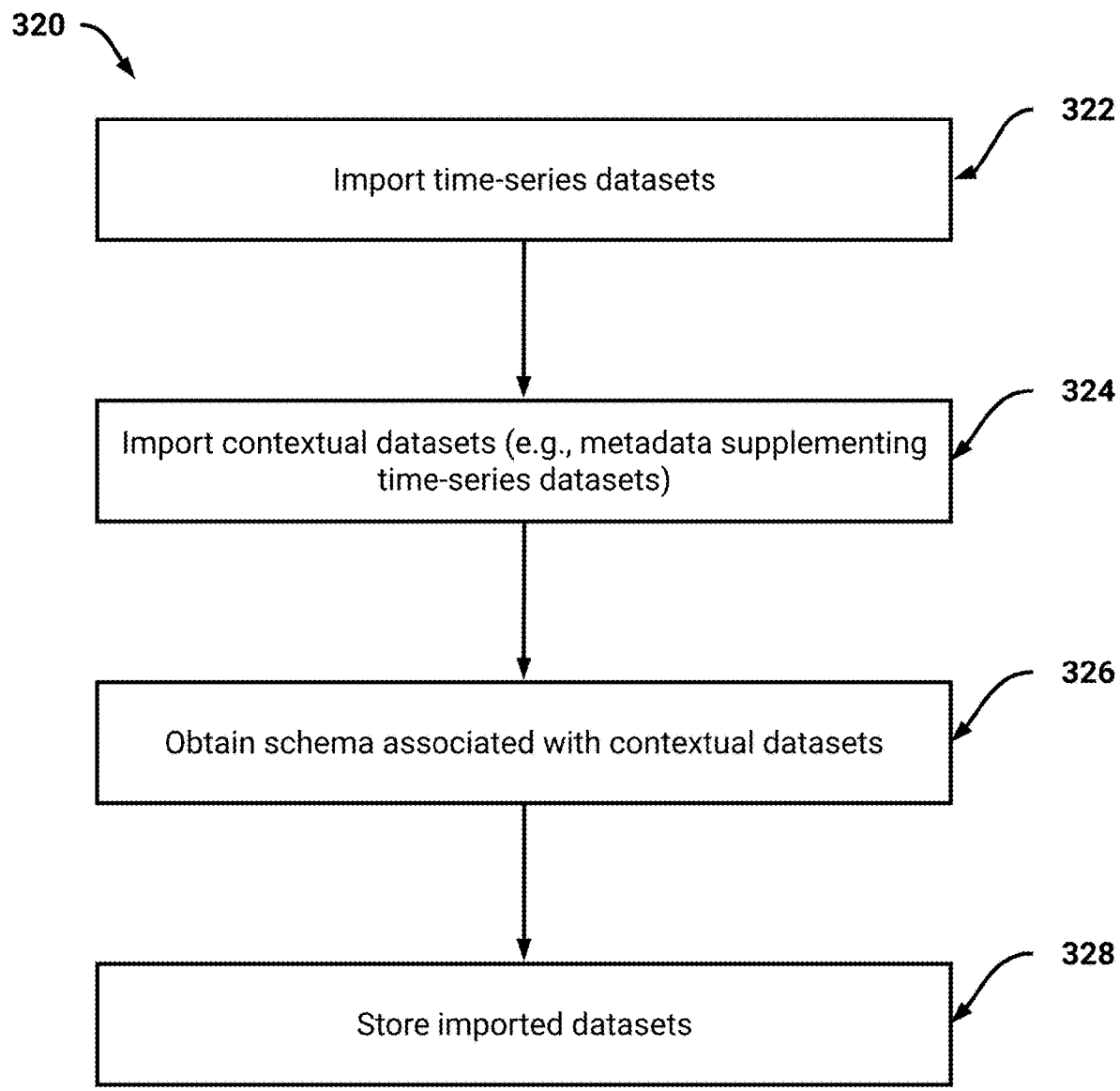
FIG. 3C illustrates a flowchart of an example process for importing time-series datasets.

FIG. 3C illustrates a flowchart of an example process 320 for importing time-series datasets. For convenience, the process 320 will be described as being performed by a system of one or more computers (e.g., the automated machine learning system 100).

At block 322, the system imports time-series datasets. As described above, time-series datasets may reflect information which is periodically sampled, or which is generated in response to certain events. Thus, the time-series datasets may indicate feature ID (e.g., a user ID, a sensor ID, and so on), a value associated with the feature ID, and a timestamp. As will be described below, the sampling rates of the imported time-series datasets may differ. Thus, the system may optionally perform an interpolation process with respect to the time-series datasets. As an example, the system may generate additional values for a time-series dataset to mimic an increase in the sampling rate.

At block 324, the system imports contextual datasets. The system may optionally import contextual datasets as described in FIG. 3A. These contextual datasets may be time-series datasets themselves or may be metadata or labels associated with the time-series datasets described in block 322.

At block 326, the system obtains a schema associated with the contextual datasets. To utilize the contextual datasets, the system may obtain a schema. For example, the schema may indicate a type associated with the values (e.g., a weather pattern, a holiday, and so on). The schema may also indicate labels associated with the time-series datasets. As an example, the schema may indicate that certain rows of an imported time-series dataset are to be considered as outliers.

At block 328, the system stores the imported datasets. The system may, as described in FIG. 3A, store the imported datasets in cloud storage. In this way, the system may rapidly access the datasets to train the machine learning models described herein.

Example User Interface/Flowchart for ML Model Training

As will be described, the system (e.g., the automated machine learning system 100) may train one or more machine learning models. Example machine learning models may determine personalized recommendations based on user interaction datasets. Other example machine learning models may determine forecasts based on time-series datasets.

Figure 4:
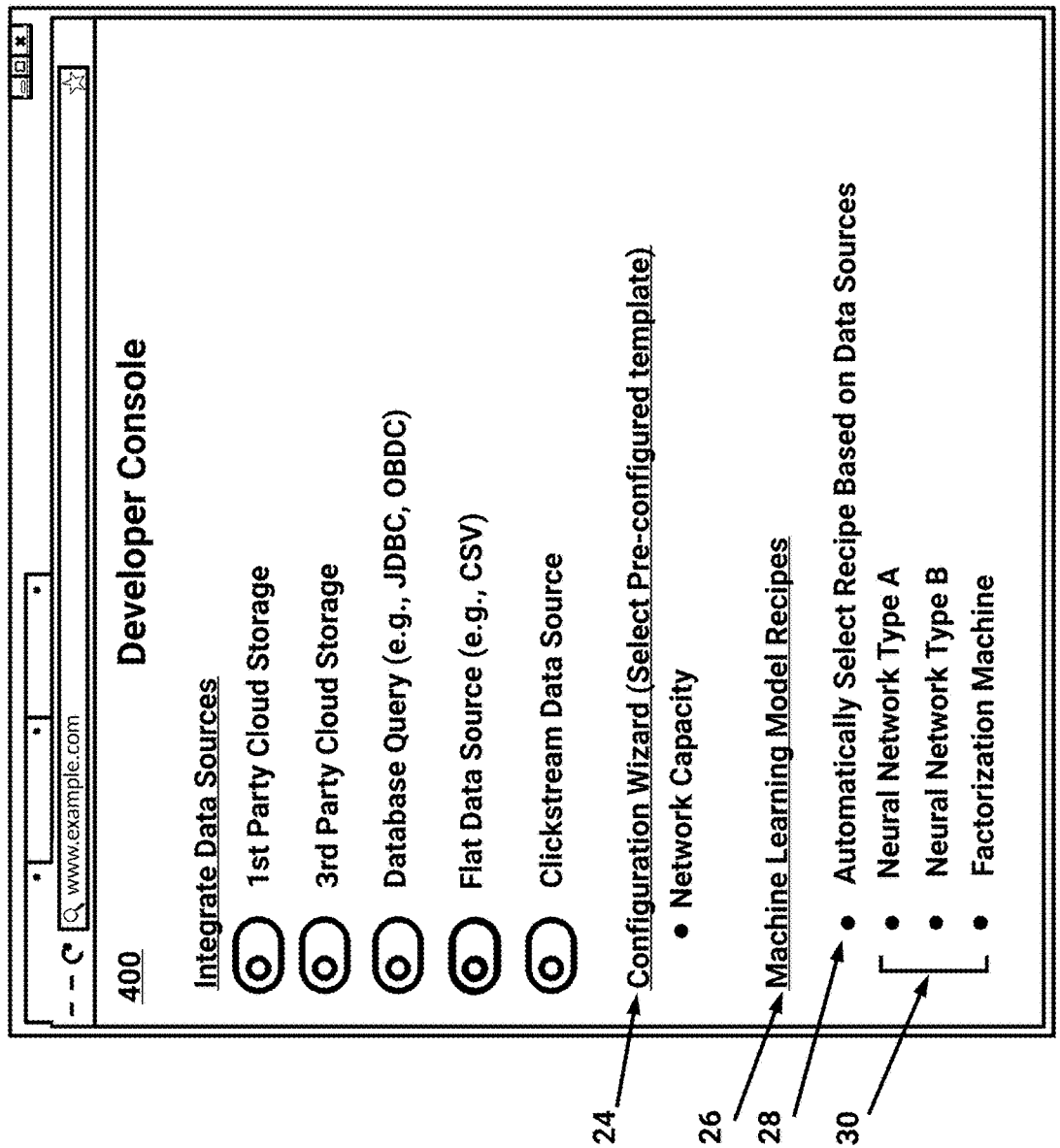
FIG. 4 illustrates an example user interface to cause training of one or more machine learning models.

FIG. 4 illustrates an example user interface 400 to cause training of one or more machine learning models. As described in FIG. 2A, a user interface may be presented to enable importation of datasets. This user interface may optionally form part of a configuration process to enable the system to train machine learning models. For example, the user interface may be part of a configuration wizard to easily cause the training, and then deployment, of a machine learning model. Thus, in some embodiments the user interface 400 may be part of the configuration process.

Advantageously, the user interface 400 may allow for the specification of a pre-configured template. As illustrated in FIG. 4, user interface 400 includes a selectable option 24 associated with selection of a template. With respect to time-series datasets, example templates may include supply chain forecasting, network capacity forecasting, staffing forecasting, and so on. These templates may inform the machine learning model recipes which are utilized by the system to train machine learning models. For example, the system may utilize the template to indicate that a first type of machine learning model (e.g., a neural network) will likely produce less error than a second type of machine learning model (e.g., a clustering model). Thus, the system may avoid training this second type of machine learning model to conserve processing resources and reduce a time of processing for the user.

The user interface 400 further indicates machine learning model recipes 26. As described above, a machine learning model recipe may indicate a type of machine learning model optionally along with certain hyperparameters or ranges of hyperparameters. The user may optionally select a particular machine learning model recipe to utilize. For example, the user may select from among the presented recipes 30, such as neural network type A, neural network type B, factorization machine, and so on. An example neural network may be a sequence model with or without attention, DeepAR, and so on. The presented recipes 30 may optionally be selected according to the template specified by selection option 24.

The user interface 400 may be configured to respond to user input directed to a particular machine learning model recipe. For example, if the user selects neural network type A then the user interface 400 may update to include details of the neural network. Example details may include a description of the neural network, such as the types of datasets with which it is considered to be effective. The description may further indicate the hyperparameters associated with the neural network. Optionally, the user interface 400 may enable adjustments to the hyperparameters. For example, the user may adjust respective ranges of the hyperparameters, or select certain values of the hyperparameters. The description may further indicate an amount of data which is preferable. For example, and with respect to time-series datasets, the description may indicate that at least a 1000 data points and/or at least 50 datasets are preferable.

In some embodiments, the user interface 400 may indicate a rating or ranking associated with a machine learning model recipe. For example, the rating may be based on a particular neural network and the user's imported datasets. The rating may be generated by the system based on analyses of the user's datasets. For example, the system may perform heuristics with respect to the datasets to ascertain the type of data included. The heuristics may be based on prior trained machine learning models and associated error metrics. For example, the system may determine a comparison between aspects of the imported datasets and prior datasets, and then identify error metrics associated with machine learning models trained with respect to the prior datasets. The system may then determine a rating based on these comparisons.

With respect to time-series datasets, forecasting may be considered as a regression function, with a last T values of and input time series as features, and the next T' values as targets. The sequential nature of the time series implies that there may be a lot of structure to these parameters. A specific structure that the system may thus exploit is the recurrent structure in time series. The system may therefore recommend, and utilize, Recurrent Neural Networks to compress histories. Parameter tying may allow the system to learn models which are less likely to overfit, or alternatively use model complexity in the right places. Optionally, the user may specify, or provide, a hypothesized structure, and the system may encode it using skip-connections. In this way, performance may be improved.

User interface 400 further includes a selectable option 28 to cause the system to automatically select a best machine learning model. As will be described, the system may train multitudes of machine learning models and determine error metrics for each. The system may then select a machine learning model with lowest error metrics. In this way, user interface 400 may mask the deep complexities associated with such training.

The system may optionally train classical or statistical models. For example, the system's training engine may be built on a number of advanced forecasting algorithms covering small data use-cases to large data use-cases. For small data use-cases, well-known statistical models such as ETS (exponential smoothing) may be utilized to provide forecasts with respect to time-series datasets. As more datasets are utilized, the system may use the data to improve upon ETS. Once the system receives greater than a threshold quantity of data, the system may use a variety of techniques including cross-time series learning, uncertainty quantification, parameter tying and skip connections.

Figure 5A:
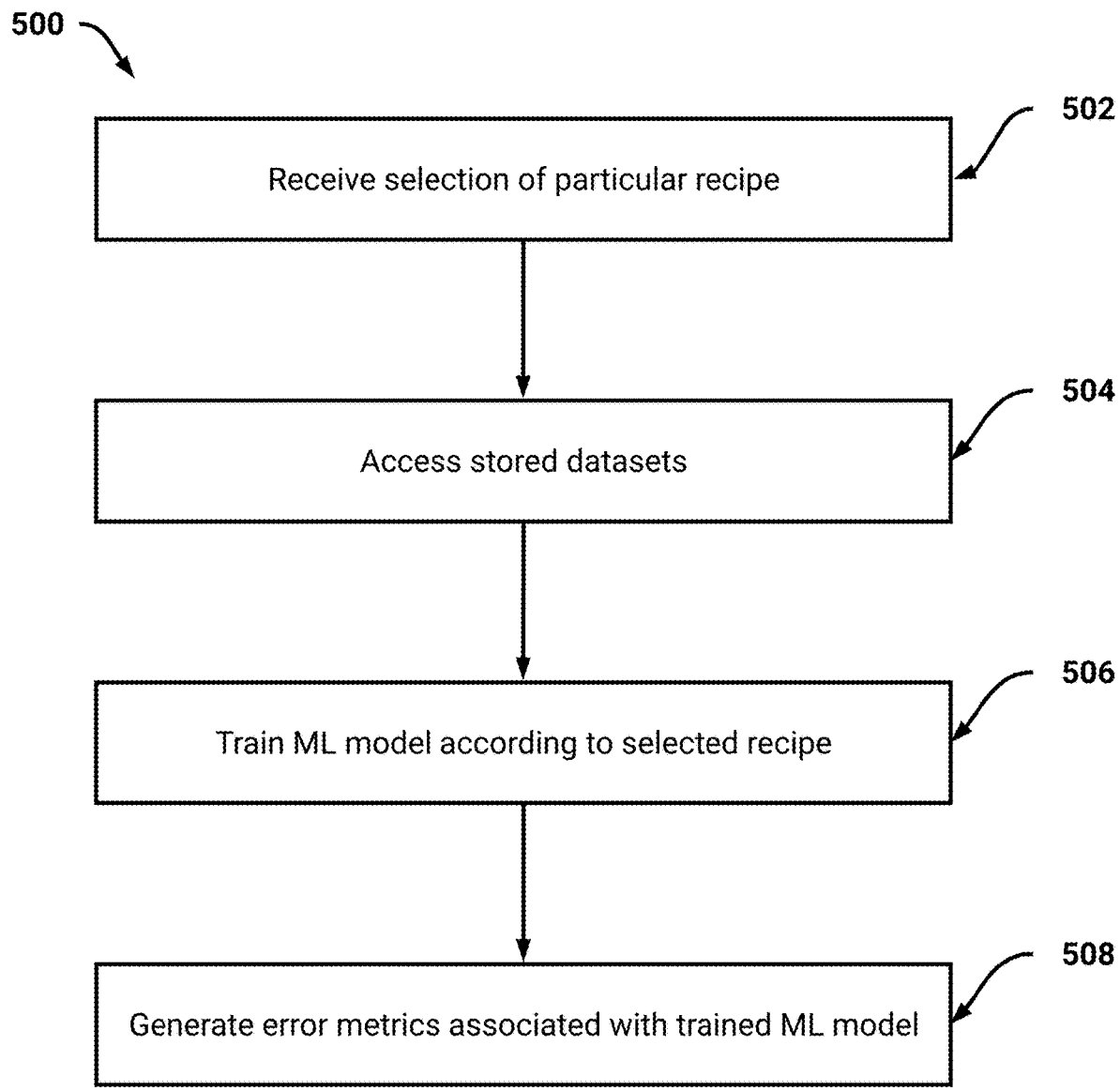
FIG. 5A illustrates a flowchart of an example process for training a machine learning model according to a selected recipe.

FIG. 5A illustrates a flowchart of an example process 500 for training a machine learning model according to a selected recipe. For convenience, the process 500 will be described as being performed by a system of one or more computers (e.g., the automated machine learning system 100).

At block 502, the system receives selection of a particular machine learning model recipe. As described in FIG. 4, a user (e.g., associated with an entity) may select from amongst presented machine learning model recipes. Optionally, the system may receive an API call associated with initiating training. The machine learning model recipe may inform a particular type of machine learning model to be trained. Thus, for certain users with knowledge of such models, the user may prefer that a particular model be trained.

At block 504, the system accesses stored datasets. As described in FIGS. 2A-3B, the system may store, or have access to, datasets associated with the entity. The system may obtain these datasets and generate a training dataset, a validation dataset, and optionally a test dataset. For example, the system may assign a threshold quantity of data (e.g., 85%, 90%, and so on) to be a training dataset. The system may then assign the remaining data to be the validation dataset.

Figure 6A:
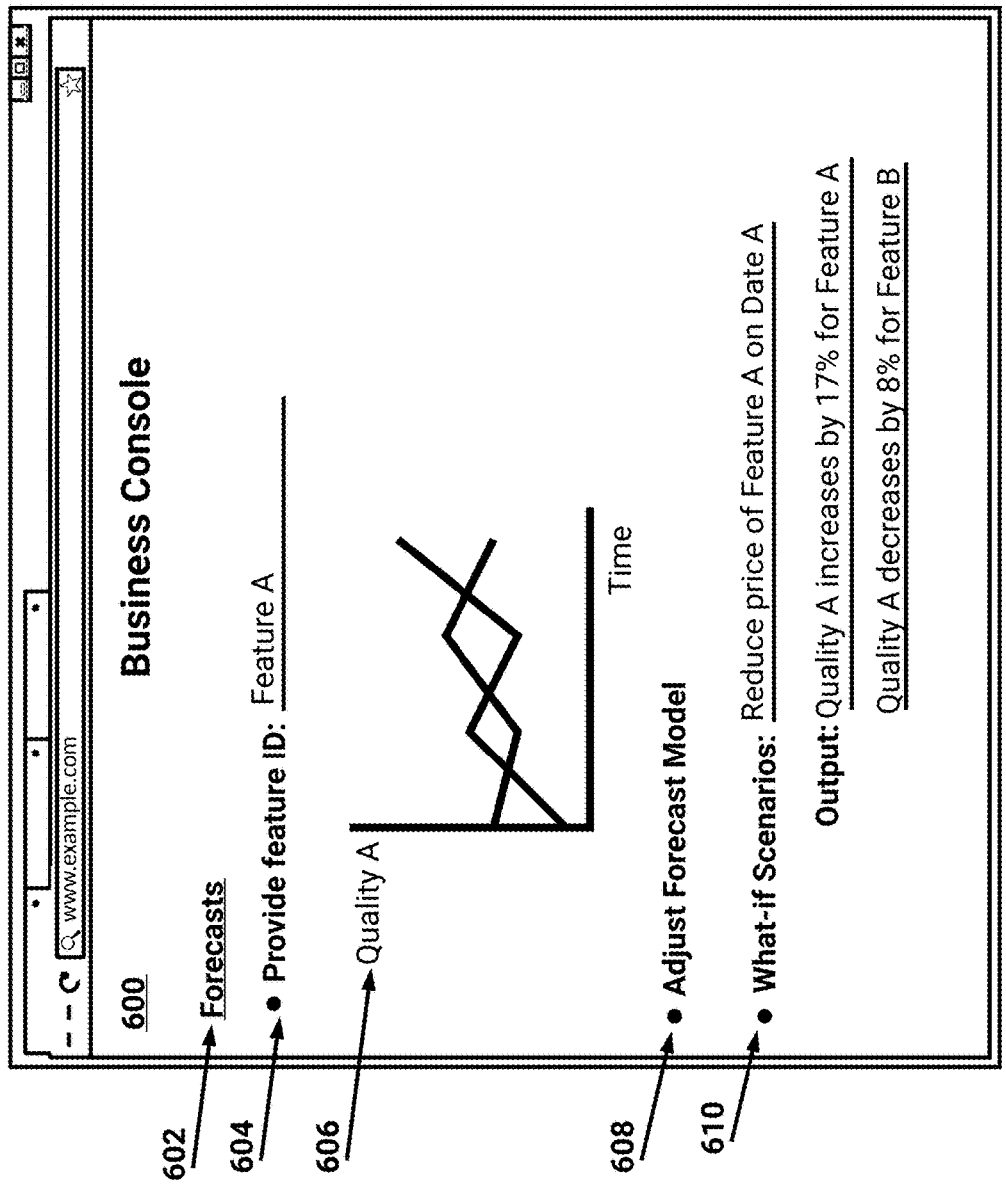
FIG. 6A illustrates an example user interface presenting analyses generated based on one or more trained machine learning models.

At block 506, the system trains a machine learning model according to a selected recipe. The system may train the model based on the training dataset. Optionally, the system may train multitudes of models, for example with varying hyperparameters. The trained machine learning model may be utilized to determine forecasts, for example as illustrated in FIG. 6A. Additionally, the system may learn to quantify distribution of forecasts. For example, the system may not just learn mean values. The system may utilize modified loss functions and specific deep neural network structures that learn to quantify forecast uncertainty.

As described above, the system may also generate classical statistical analyses and models. For example, if the amount of data available to the system is below a threshold, the system may train classical models.

At block 508, the system generates error metrics associated with the trained machine learning model. For example, the system may generate multitudes of models with varying hyperparameters. The system may thus compute error metrics, for example based on the validation dataset described above. Without being constrained by theory, it should be appreciated that there may be multitudes of error metrics. Example metrics may include metrics such as proficient at k, NCVG, and so on. The system may then select a machine learning model with lowest the best error metrics.

Optionally, and with respect to user interaction datasets, the system may ensure that the trained machine learning model provides superior performance to that of classical schemes. For example, the system may determine similarity metrics. Examples of similarity metrics may include determining similarities between users according to items to which the users have interacted. In a classical similarity model, the system may compute a distance metric between items. Users may thus be clustered according to the items interacted with by the users. The system may thus determine whether items recommended to users based on the trained machine learning model produces less error than items which would be recommended based on the similarity model. If the classical model is superior to the machine learning model, the system may discard the machine learning model. Optionally, the system may request that additional datasets be provided.

As will be described below, with respect to FIG. 5B, the system may optionally determine that two or more machine learning models are to be utilized. Additionally, the system may determine that two or more machine learning models are to be combined by a model to generate an output.

Figure 5B:
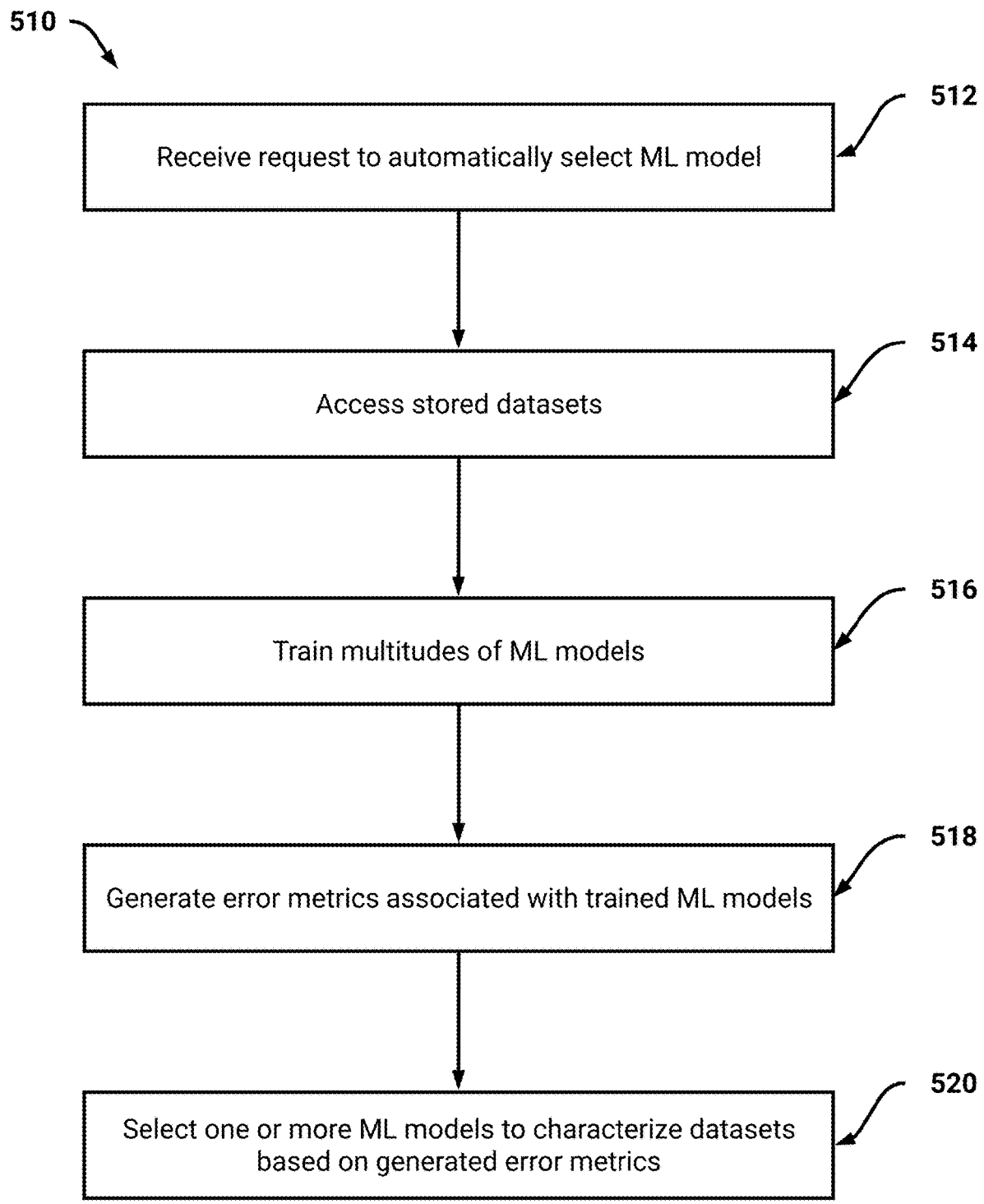
FIG. 5B illustrates a flowchart of an example process for automatically selecting a recipe to train a machine learning model.

FIG. 5B illustrates a flowchart of an example process 510 for automatically selecting a recipe to train a machine learning model. For convenience, the process 510 will be described as being performed by a system of one or more computers (e.g., the automated machine learning system 100).

At block 512, the system receives a request to automatically select a machine learning model. As described above, a user may interact with a user interface to cause the system to determine a machine learning model with the best error metrics. The user may also provide an API call, including custom machine learning models to process.

At block 514, the system accesses stored datasets and at block 516 the system trains multitudes of machine learning models. The system may, as described in FIG. 4, analyze the datasets to determine types of machine learning models to train. For example, and with respect to user interaction data, the system may determine that a recurrent neural network with attention is to be utilized. These analyses may be based on prior determined machine learning models and error metrics. Thus, the system may determine how similar the datasets are to datasets previously utilized. The system may thus train machine learning models of varying type, and also of varying hyperparameters for each type.

Similar to FIG. 5A, the system may separate the datasets into training data and validation data. Optionally, each machine learning model which is being trained may have a different subset of the datasets utilized as training data and validation data. For example, the system may randomly select 90% of the data as being training data, with the random selection occurring for each machine learning model. Optionally, each machine learning model may be trained using a same subset of the datasets.

At block 518, the system generates error metrics associated with the training machine learning models. The system may generate the metrics as described in FIG. 5A.

At block 520 the system selects one or more machine learning models. The system may select a machine learning model which provides superior performance to that of other machine learning models. Optionally, the system may determine that two or more machine learning models are to be implemented. For example, and with respect to user interaction data, the system may determine that a first type of machine learning model provides better performance for certain items or users. In this example, the system may thus characterize which items, users, and so on, are to be associated with a certain machine learning model.

In some embodiments, the system may determine that two or more machine learning models are to be combined to produce an output. For example, the system may generate a model which combines two distinct machine learning models. The system may train this generated model to produce output superior to that of any one machine learning model. The generated model may thus weight output associated with each model or use the outputs as signals.

Once the machine learning model(s) is/are trained, the system may implement (e.g., host) the model(s). With respect to a single model, the system may thus receive requests for the model to generate an output. With respect user interaction data, the system may receive a user ID and then generate personalized recommendations for this user ID. The personalized recommendations may include a ranked ordering of a threshold number of item IDs. As described above, the system may receive clickstream data. For example, the clickstream data may indicate recent interactions of a user. Thus, the system may utilize the clickstream data as a signal to provide recommendations which are based, at least in part, on the present or more recent actions of the user.

Example User Interface/Flowchart for Using Machine Learning Models

FIG. 6A illustrates an example user interface 600 presenting analyses generated based on one or more trained machine learning models. User interface presents an example of a console (e.g., a business console) which may be utilized by a user. For example, the business console may be accessed by users associated with an entity. The entity may have caused training of one or more machine learning models, for example as described above. Thus, the users may provide authentication information to access the user interface 600. The user interface 600 may be generated by a system (e.g., the automated machine learning system 100), or the user interface 600 may be integrated with the entity (e.g., via lightweight directory access protocol).

Utilizing the user interface, a user may can look-up the forecast of any (group of) product/item IDs in an item catalog associated with the user. For example, the user may be associated with an entity operating an electronic marketplace. The user may also override forecasts made by the system and enter notes for the reasons behind the override. The user may also explore different forecast models or model configurations. The user may also perform what-if scenario analysis by changing a particular variable (e.g. price of the item/product). Optionally, the user interface may present additional information on why the forecast was calculated in specific way (e.g., visualize a promotion or price change).

In the user interface 600, a forecast 602 is presented. The user may specify a particular feature 604 in the user interface 600. An example feature may relate to an item. For example, the user may request a forecast associated with the item (e.g., demand, sales, and so on). As illustrated in FIG. 6A, the user interface 600 has presented a graphical depiction 606 of a forecast. The graphical depiction 606 presents a forecast in which time is mapped against a certain quality. For example, the quality may be demand, sales, a user-selectable quality, and so on. While the depiction 606 indicates two lines (e.g., a historical line, and a forecast line predicted based on a machine learning model), the depiction 606 may solely include the forecasted line. Optionally, the forecast may be output as a flat file (e.g., CSV file) for ingestion by a device or system of the user.

The user interface 600 further indicates that the forecast model (e.g., trained machine learning model) may be adjusted via interaction with selectable object 608. Upon interaction, the user may adjust the model. Example adjustments may include adjustment of hyperparameters, selection of a new model, and so on. Optionally, the system may re-train the machine learning model based on these adjustments.

The user may interact with portion 610 to provide certain 'what-if' scenarios. For example, the user has requested that the system determine an effect of reducing a price of feature A (e.g., an item) on a certain upcoming date. This may represent a promotion which is being considered, for example at the certain date. As illustrated, the system has determined that a certain quality (e.g., sales) may increase by 17%. Due to the deep learning-based nature of the techniques described herein, the system has also determined that the quality will decrease for a different feature. With respect to the features being items, the system may thus determine that sales of feature B will be reduced (e.g., cannibalized).

Figure 6B:
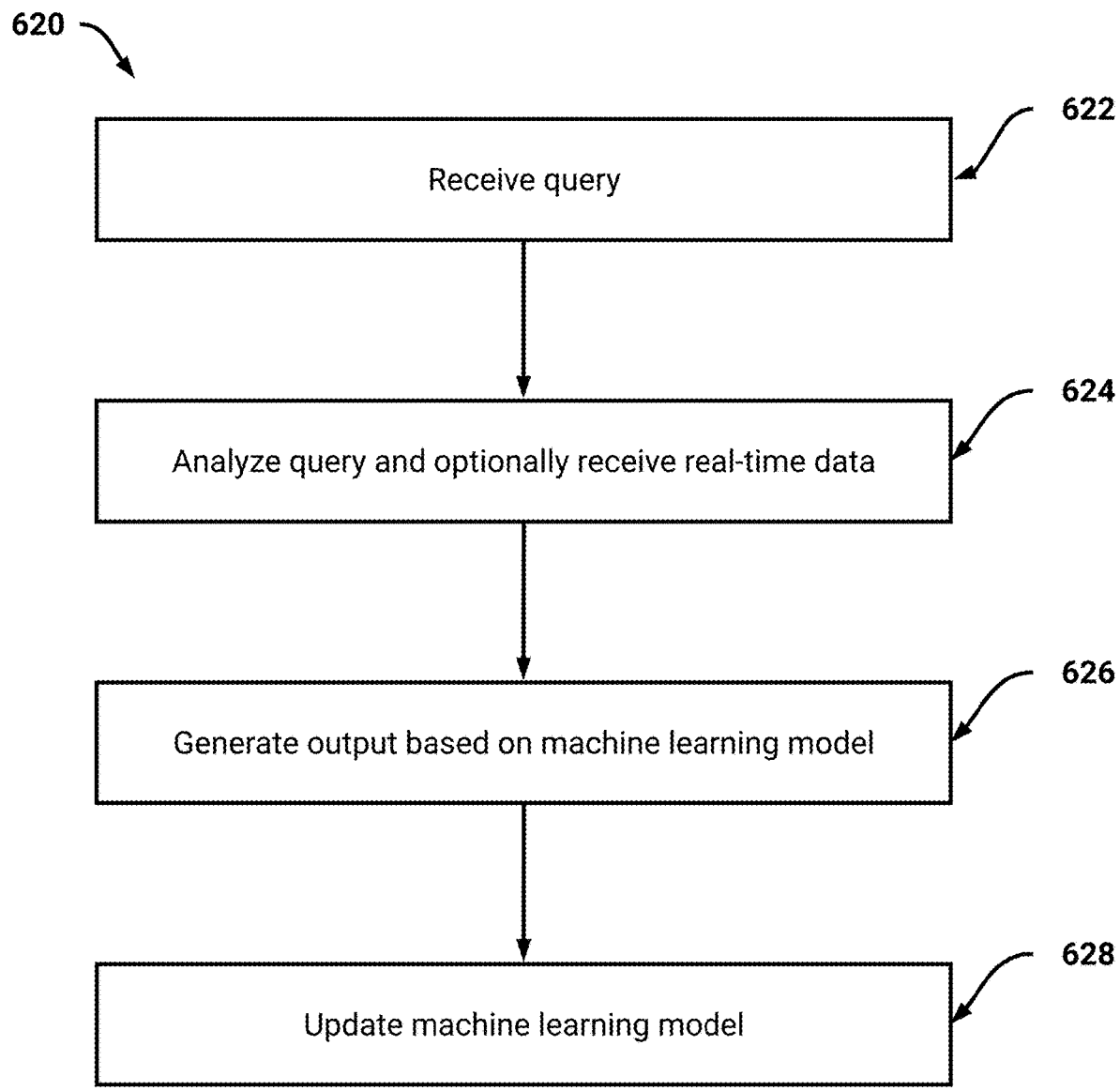
FIG. 6B illustrates a flowchart of an example process for processing a query received from a user.

FIG. 6B illustrates a flowchart of an example process 620 for processing a query received from a user. For convenience, the process 620 will be described as being performed by a system of one or more computers (e.g., the automated machine learning system 100).

At block 622, the system receives a query. As described above, the query may be received via a user interface (e.g., user interface 600) or via an API call (e.g., as described in FIG. 1). With respect to an API call, the system may receive the query from a server, or other system, which requires real-time output from the system. For example, a server may present real-time recommendations to a user of the server. In this example, the server may be an electronic marketplace and present recommended items to the user. Thus, as the user browses the web pages hosted by the server, the server may provide personalized recommendations.

At block 624, the system analyzes the query and optionally receives real-time data. With respect to a machine learning model trained on user interaction datasets, the system may analyze the query to identify a particular user ID implicated in the query. As described above, the system may receive real-time datasets (e.g., clickstream data). Thus, the system may obtain clickstream data associated with the particular user ID. As described above, this clickstream data may indicate recent interactions of the user. For example, if the user added an item to a cart but then did not check out, the clickstream data may reflect this. As another example, if the user listened to five songs, and clicked around in a next set of songs, the clickstream data may reflect this. In the latter example, this may indicate that the user liked the five songs and was curious about the next songs (e.g., the user may not have liked the songs enough to listen fully).

Optionally, and with respect to a server as described above, the query may additionally indicate search terms entered by a user associated with the particular user ID. For example, as the user provides search terms in a search box of a web page hosted by the server, the server may provide the terms to the system. Utilizing one or more trained sequence models, the system generate output to recommend items.

At block 626, the system generates output based on one or more machine learning models. The system may utilize the trained machine learning model, or multiple models, to generate an output responsive to the query. An example query may indicate a certain item ID, or features of an item. For example, the query may indicate features of an item which is new. Thus, the system may utilize trained machine learning models to output user IDs corresponding to users who should be recommended the new item. Though the system may not have seen the item before, as described above the system may be trained using contextual data associated with items. Thus, the system may provide personalized recommendations with a new item.

With respect to a query relating to forecasts, the system may generate a forecast based on machine learning models. For example, the query may relate to a forecast utilized by a server hosting, or cloud-based processing, entity. Examples of forecasts may include forecasts regarding capacity planning, storage demand, and so on. The queries may also relate to 'what-if' scenarios. For example, the query may request an analysis based on an impact of an upcoming product launch. The query may also request an analysis regarding any forecasted, upcoming, traffic surge.

Optionally, and with respect to personalized recommendations, the system may attempt to introduce items which are not commonly being recommended by the system. For example, the system may utilize the clickstream data or a bandit-based scheme to recommend less popular, or unknown items. The system may then receive information indicating whether these less recommended items were selected by a user. For example, the system may receive clickstream data indicating whether the user selected an item. If so, the system may update the machine learning model as described below.

At block 628, the system updates the machine learning model. The system may update the machine learning model based on feedback received by the requesting entity. For example, the requesting entity may be associated with a server providing personalized recommendations to a user. Thus, the system may receive feedback regarding which of the items the user selected, listened to, watched, and so on. This feedback may be utilized to update the machine learning models. Additionally, the system may aggregate the received real-time data. Periodically, the system may update the machine learning models based on the real-time data. With respect to time-series datasets, the system may periodically update the machine learning models when the datasets are updated. For example, the system may periodically poll integrated data sources for any updated.

Example System

Figure 7:
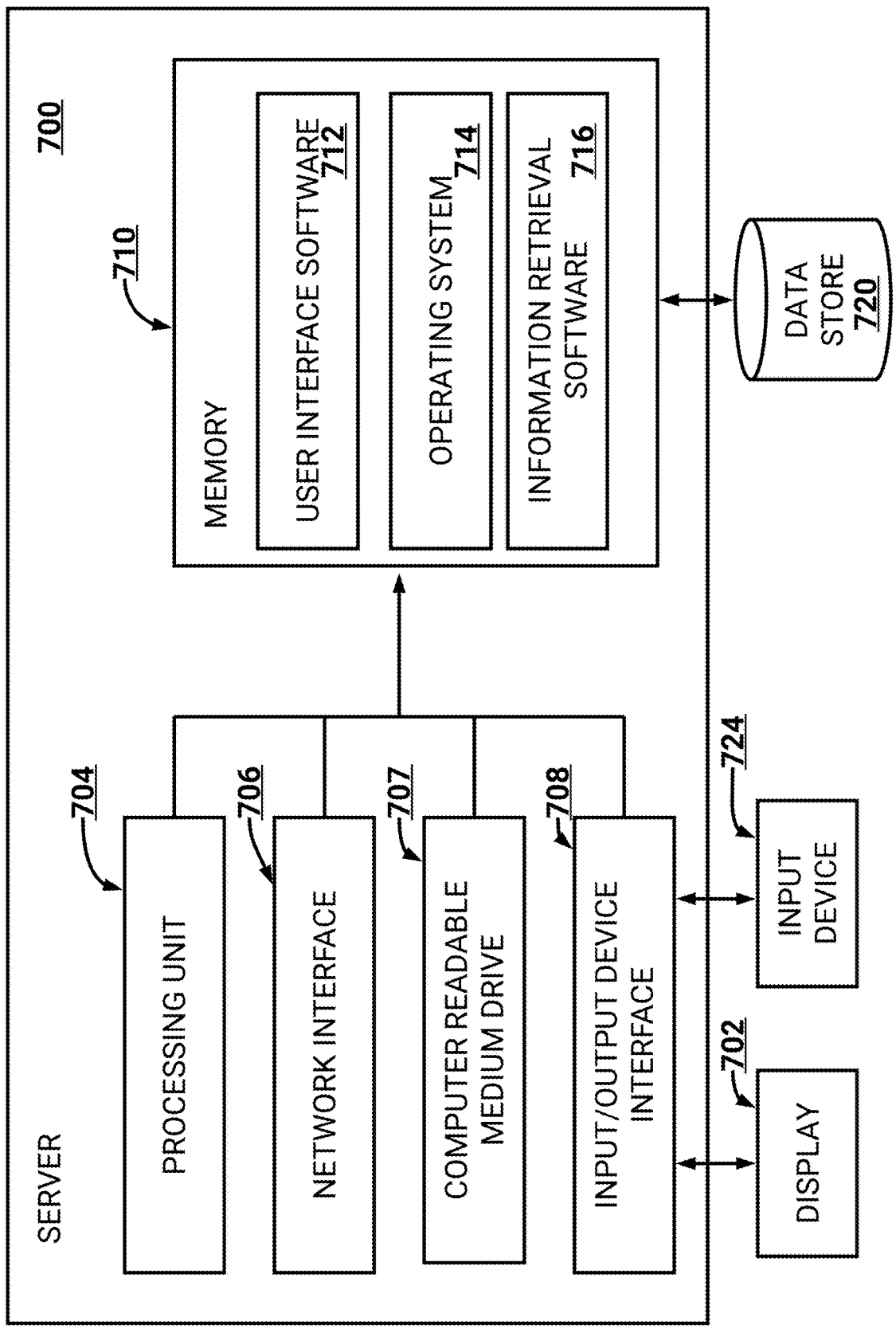
FIG. 7 is a block diagram depicting an illustrative configuration of one embodiment of a server than may implement elements of the systems described herein.

FIG. 7 is a block diagram depicting an illustrative configuration of one embodiment of a server 700 than may implement elements of the automated machine learning system 100. The general architecture of server 700 depicted in FIG. 7 includes an arrangement of computer hardware and software components that may be used to implement aspects of the present disclosure. As illustrated, the server 700 includes a processing unit 704, a network interface 706, a computer readable medium drive 707, an input/output device interface 720, a display 702, and an input device 724, all of which may communicate with one another by way of a communication bus. The network interface 706 may provide connectivity to one or more networks or computing systems, such as to one or more clients, indexing systems, data storage systems, and so on. The processing unit 704 may thus receive information and instructions from other computing systems or services via a network. The processing unit 704 may also communicate to and from memory 710 and further provide output information for an optional display 702 via the input/output device interface 720. The input/output device interface 720 may also accept input from the optional input device 724, such as a keyboard, mouse, digital pen, etc. In some embodiments, the server 700 may include more (or fewer) components than those shown in FIG. 7. For example, some embodiments of the server 700 may omit the display 702 and input device 724, while providing input/output capabilities through one or more alternative communication channel (e.g., via the network interface 706).

The memory 710 may include computer program instructions that the processing unit 704 executes in order to implement one or more embodiments. The memory 710 generally includes RAM, ROM, and/or other persistent or non-transitory memory. The memory 710 may store an operating system 714 that provides computer program instructions for use by the processing unit 704 in the general administration and operation of the server 700. The memory 710 may further include computer program instructions and other information for implementing aspects of the present disclosure. For example, in one embodiment, the memory 710 includes user interface software 712 that generates user interfaces (and/or instructions therefor) for display upon a computing device, e.g., via a navigation interface such as a web browser installed on the computing device. In addition, memory 710 may include or communicate with one or more auxiliary data stores, such as data store 720, which may correspond to any persistent or substantially persistent data storage, such as a hard drive (HDD), a solid-state drive (SDD), network attached storage (NAS), a tape drive, or any combination thereof.

In addition to the user interface module 712, the memory 710 may include information retrieval software 716 that may be executed by the processing unit 704. In one embodiment, the information retrieval software 716 implements various aspects of the present disclosure. For example, determining ML models and proposing blocks for inclusion in a blockchain. As another example, evaluating proposed blocks and committing, or not committing, the proposed blocks into the blockchain. While the information retrieval software 716 is shown in FIG. 7 as part of the server 700, in other embodiments, all or a portion of the software may be implemented by alternative computing devices, such as virtual computing devices within a hosted computing environment.

Each of the processes, methods, and algorithms described in the preceding sections may be embodied in, and fully or partially automated by, code modules executed by one or more computer systems or computer processors comprising computer hardware. The code modules (or "engines") may be stored on any type of, one or more, non-transitory computer-readable media (e.g., a computer storage product) or computer storage devices, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, for example, volatile or non-volatile storage.

In general, the terms "engine" and "module," as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on one or more computer readable media, such as compact discs, digital video discs, flash drives, or any other tangible media. Such software code may be stored, partially or fully, on a memory device of the executing computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

User interfaces described herein are optionally presented (and user instructions may be received) via a user computing device using a browser, other network resource viewer, a dedicated application, or otherwise. Various features described or illustrated as being present in different embodiments or user interfaces may be combined into the same embodiment or user interface. Commands and information received from the user may be stored and acted on by the various systems disclosed herein using the processes disclosed herein. While the disclosure may reference to a user hovering over, pointing at, or clicking on a particular item, other techniques may be used to detect an item of user interest. For example, the user may touch the item via a touch screen, or otherwise indicate an interest. The user interfaces described herein may be presented on a user terminal, such as a laptop computer, desktop computer, tablet computer, smart phone, virtual reality headset, augmented reality headset, or other terminal type. The user terminals may be associated with user input devices, such as touch screens, microphones, touch pads, keyboards, mice, styluses, cameras, etc. While the foregoing discussion and figures may illustrate various types of menus, other types of menus may be used. For example, menus may be provided via a drop-down menu, a tool bar, a pop-up menu, interactive voice response system, or otherwise.

The various features and processes described herein may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y or Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y or at least one of Z to each be present.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated herein, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A method implemented by a system of one or more computers, the method comprising:
   causing presentation, via a user device, of an interactive user interface, wherein the interactive user interface:
      enables integration of one or more data sources with the system, the data sources storing datasets to be utilized to train one or more machine learning models by the system, and the datasets reflecting user interaction datasets, and
      presents indications of machine learning model recipes, wherein a machine learning model recipe is utilized to train one or more machine learning models;
   receiving user input, via the interactive user interface, of selection of a data source to be integrated and a machine learning model recipe;
   importing a dataset from the data source, and training one or more machine learning models based on the selected machine learning model recipe; and
   implementing a first trained machine learning model of the one or more trained machine learning models, wherein the system is configured to respond to queries based on the implemented machine learning model, and wherein the responses comprise personalized recommendations.

2. The method of claim 1, wherein the data source comprises a cloud-based data source, and wherein the system is configured to provide authentication information to the cloud-based data source to enable access to the stored datasets.

3. The method of claim 1, wherein the machine learning model recipe indicates a particular type of machine learning model to be learned, or indicates that the system is to select a machine learning model to be implemented from a plurality of trained machine learning models based on error metrics.

4. The method of claim 3, wherein the selected machine learning model indicates the system is to select the implemented machine learning model, and wherein training the machine learning model comprises:

selecting a plurality of types of machine learning models, each type of machine learning model being associated with respective ranges of hyperparameters;

training, for each type of machine learning model, a plurality of machine learning models associated with different hyperparameters within the ranges of hyperparameters; and selecting a machine learning model for implementation based on error metrics associated with the trained machine learning models.

5. The method of claim 1, wherein the presented machine learning model recipes are based on heuristics determined from the imported dataset.

6. The method of claim 1, wherein the user interaction datasets reflect interactions of users with items or streaming content, and wherein the dataset includes a plurality of rows recording reflected interactions.

7. The method of claim 1, wherein the one or more trained machine learning models are trained using the imported dataset and one or more contextual datasets, the contextual datasets including features associated with items or users.

8. A system comprising one or more computers and non-transitory computer-storage media storing instructions that when executed by the one or more computers, cause the one or more computers to perform operations comprising:

receiving user specification of one or more data sources to be integrated with the system, the data sources storing datasets to be utilized to train one or more machine learning models by the system, and the datasets reflecting user interaction data;

importing a dataset from the data source, and automatically training one or more machine learning models based on a particular machine learning model recipe of a plurality of machine learning model recipes; and implementing a first trained machine learning model of the one or more trained machine learning models, wherein the system is configured to respond to queries based on the implemented machine learning model, and wherein the responses comprise personalized recommendations.

9. The system of claim 8, wherein the data source comprises a cloud-based data source, and wherein the system is configured to provide authentication information to the cloud-based data source to enable access to the stored datasets.

10. The system of claim 8, wherein the system user specification is received via one or more application programming interface (API) calls associated with the system, or received via a user interface provided for presentation by the system.

11. The system of claim 8, wherein the machine learning model recipe indicates at least one of a particular type of machine learning model to be learned or an indication that the system is to select a machine learning model to be implemented from a plurality of trained machine learning models based on error metrics.

12. The system of claim 11, wherein the selected machine learning model recipe indicates the system is to select the implemented machine learning model, and wherein training the machine learning model comprises:

selecting a plurality of types of machine learning models, each type of machine learning model being associated with respective ranges of hyperparameters;

training, for each type of machine learning model, a plurality of machine learning models associated with different hyperparameters within the ranges of hyperparameters; and selecting a machine learning model for implementation based on error metrics associated with the trained machine learning models.

13. The system of claim 8, wherein the dataset is imported with a schema, and wherein the system validates the schema comprising removing information from the dataset based on the information not conforming to the schema.

14. The system of claim 8, wherein the user interaction data reflects interactions of users with items or streaming content, and wherein the dataset includes a plurality of rows recording reflected interactions.

15. The system of claim 8, wherein the one or more trained machine learning models are trained using the imported dataset and one or more contextual datasets, the contextual datasets including features associated with items or users.

16. Non-transitory computer storage storing instructions that when executed by a system of one or more computers, cause the computers to perform operations comprising:

receiving user specification of one or more data sources to be integrated with the system, the data sources storing datasets to be utilized to train one or more machine learning models by the system, and the datasets reflecting user interaction data;

importing a dataset from the data source, and automatically training one or more machine learning models based on a particular machine learning model recipe of a plurality of machine learning model recipes; and implementing a first trained machine learning model of the one or more trained machine learning models, wherein the system is configured to respond to queries based on the implemented machine learning model, and wherein the responses comprise personalized recommendations.

17. The non-transitory computer storage media of claim 16, wherein the data source comprises a cloud-based data source, and wherein the system is configured to provide authentication information to the cloud-based data source to enable access to the stored datasets.

18. The non-transitory computer storage media of claim 16, wherein the system user specification is received via one or more application programming interface (API) calls associated with the system, or received via a user interface provided for presentation by the system.

19. The non-transitory computer storage media of claim 16, wherein the machine learning model recipe indicates a particular type of machine learning model to be learned, or indicates that the system is to select a machine learning model to be implemented from a plurality of trained machine learning models based on error metrics.

20. The non-transitory computer storage media of claim 19, wherein the selected machine learning model recipe indicates the system is to select the implemented machine learning model, and wherein training the machine learning model comprises:

selecting a plurality of types of machine learning models, each type of machine learning model being associated with respective ranges of hyperparameters;

training, for each type of machine learning model, a plurality of machine learning models associated with different hyperparameters within the ranges of hyperparameters; and selecting a machine learning model for implementation based on error metrics associated with the trained machine learning models.

21. The non-transitory computer storage media of claim 16 further comprising importing one or more training models to for the one or more machine learning models.

* * * * *